(12) United States Patent
Kawakami et al.

(10) Patent No.: US 11,277,585 B2
(45) Date of Patent: Mar. 15, 2022

(54) CONTENT DISTRIBUTION SERVER, CONTENT DISTRIBUTION SYSTEM, CONTENT DISTRIBUTION METHOD, AND PROGRAM

(71) Applicant: DWANGO Co., Ltd., Tokyo (JP)

(72) Inventors: Nobuo Kawakami, Tokyo (JP); Kentarou Matsui, Hokkaido (JP); Shinnosuke Iwaki, Tokyo (JP); Takashi Kojima, Tokyo (JP); Naoki Yamaguchi, Hokkaido (JP)

(73) Assignee: DWANGO CO., LTD.

( * ) Notice: Subject to any disclaimer, the term of this patent is extended or adjusted under 35 U.S.C. 154(b) by 0 days.

(21) Appl. No.: 17/257,548

(22) PCT Filed: Jul. 23, 2019

(86) PCT No.: PCT/JP2019/028802
§ 371 (c)(1),
(2) Date: Dec. 31, 2020

(87) PCT Pub. No.: WO2020/044874
PCT Pub. Date: Mar. 5, 2020

(65) Prior Publication Data
US 2021/0321061 A1    Oct. 14, 2021

(30) Foreign Application Priority Data

Aug. 31, 2018  (JP) .............................. JP2018-162628

(51) Int. Cl.
*H04L 12/18* (2006.01)
*H04N 7/15* (2006.01)
(Continued)

(52) U.S. Cl.
CPC ......... *H04N 7/157* (2013.01); *H04L 12/1813* (2013.01); *H04L 12/1827* (2013.01);
(Continued)

(58) Field of Classification Search
CPC ............... H04N 7/157; H04N 21/2187; H04N 21/8146; H04L 12/1813; H04L 12/1831; H04L 12/1827; H04L 65/1093
See application file for complete search history.

(56) References Cited

U.S. PATENT DOCUMENTS 9,576,330 B2 *  2/2017  Cebolla ................. A63F 13/213
11,082,462 B2 *  8/2021  Miller ..................... G06F 3/013
(Continued)

FOREIGN PATENT DOCUMENTS

JP    2000040161 A    2/2000
JP    2002244988 A    8/2002
(Continued)

OTHER PUBLICATIONS

PCT/JP2019/028802 International Search Report and Written Opinion dated Oct. 15, 2019, 2 pgs.

*Primary Examiner* — Hitesh Patel
(74) *Attorney, Agent, or Firm* — Bracewell LLP; Doug F. Stewart; Patrick J. Connolly

(57) ABSTRACT

Provided is a content distribution server that is configured to improve the convenience of virtual space sharing formats. The content distribution server comprises: a participation accepting unit that accepts a participation request from another individual to participate in a virtual space used for distribution by a distributor; an information acquiring unit that acquires motion information indicating movement by the distributor and a participant participating on the basis of a participation request, as well as information on the virtual characters of the distributor and the participant; and a distribution unit that distributes live content based on video in virtual space obtained by synthesizing motion information acquired by the information acquiring unit with movement by the virtual characters.

8 Claims, 13 Drawing Sheets

(51) Int. Cl.
*H04L 65/1093* (2022.01)
*H04L 67/131* (2022.01)
*H04N 21/2187* (2011.01)
*H04N 21/81* (2011.01)

(52) U.S. Cl.
CPC ...... *H04L 12/1831* (2013.01); *H04L 65/1093* (2013.01); *H04L 67/38* (2013.01); *H04N 21/2187* (2013.01); *H04N 21/8146* (2013.01)

(56) References Cited

U.S. PATENT DOCUMENTS

| | | | | |
|---|---|---|---|---|
| 11,200,624 | B1* | 12/2021 | McCune | G06Q 40/12 |
| 2007/0188502 | A1* | 8/2007 | Bishop | G06T 13/80 |
| | | | | 345/473 |
| 2009/0055754 | A1* | 2/2009 | Finn | G07F 17/32 |
| | | | | 715/757 |
| 2017/0237786 | A1* | 8/2017 | Crowe | H04L 51/10 |
| | | | | 709/204 |
| 2018/0331841 | A1* | 11/2018 | Ross | H04L 12/1822 |
| 2018/0342106 | A1* | 11/2018 | Rosado | A63F 13/60 |
| 2019/0355178 | A1* | 11/2019 | Hermina Martinez | H04N 7/142 |
| 2019/0374857 | A1* | 12/2019 | Deller | H04L 67/38 |
| 2019/0385613 | A1* | 12/2019 | Mindlin | G10L 25/84 |
| 2020/0139194 | A1* | 5/2020 | Min | A63F 13/816 |
| 2020/0279658 | A1* | 9/2020 | Rao | G16H 50/70 |

FOREIGN PATENT DOCUMENTS

| | | |
|---|---|---|
| JP | 2002282554 A | 10/2002 |
| JP | 2013020389 A | 1/2013 |
| JP | 2014225801 A | 12/2014 |
| JP | 2015172874 A | 10/2015 |
| JP | 2016034087 A | 3/2016 |
| JP | 2017027163 A | 2/2017 |
| JP | 2017076202 A | 4/2017 |
| JP | 2018042244 A | 3/2018 |
| JP | 6349455 B1 | 6/2018 |
| JP | 2018092523 A | 6/2018 |
| JP | 6378850 B1 | 8/2018 |

* cited by examiner

[Fig. 1]
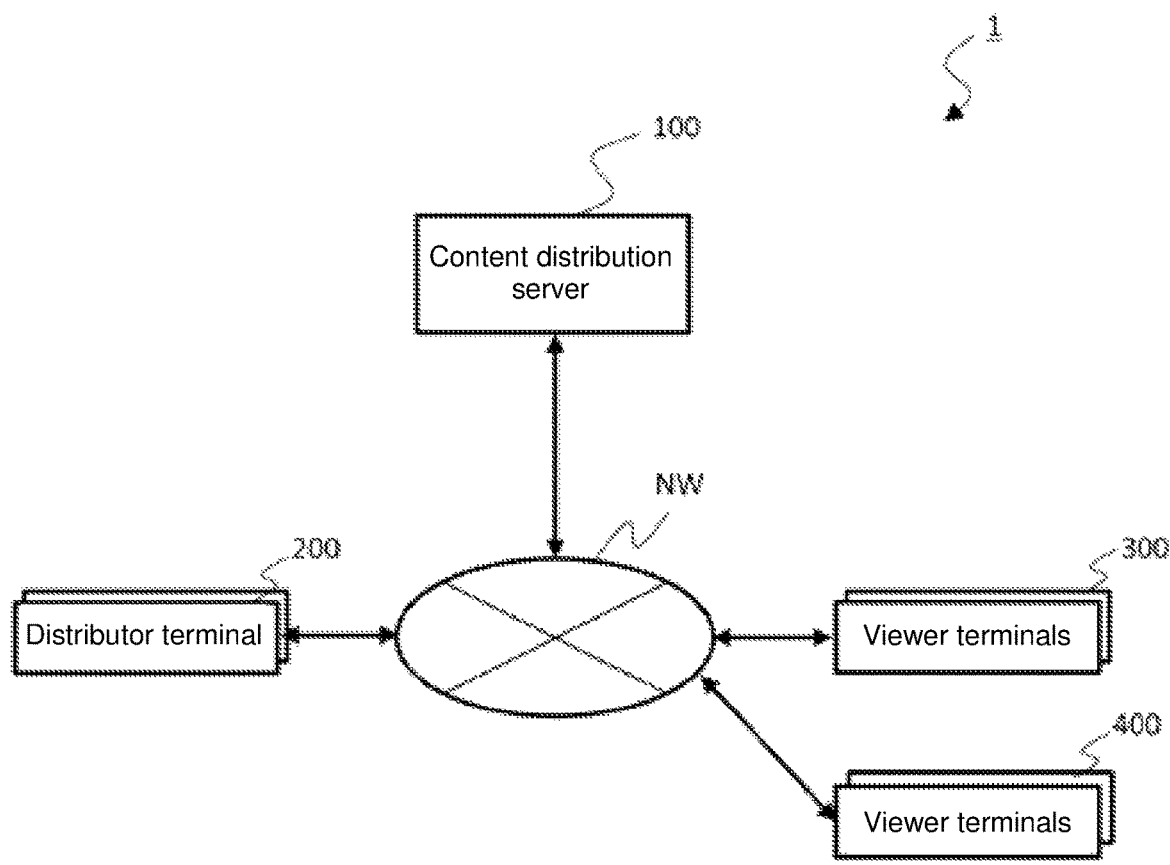

[Fig. 2]
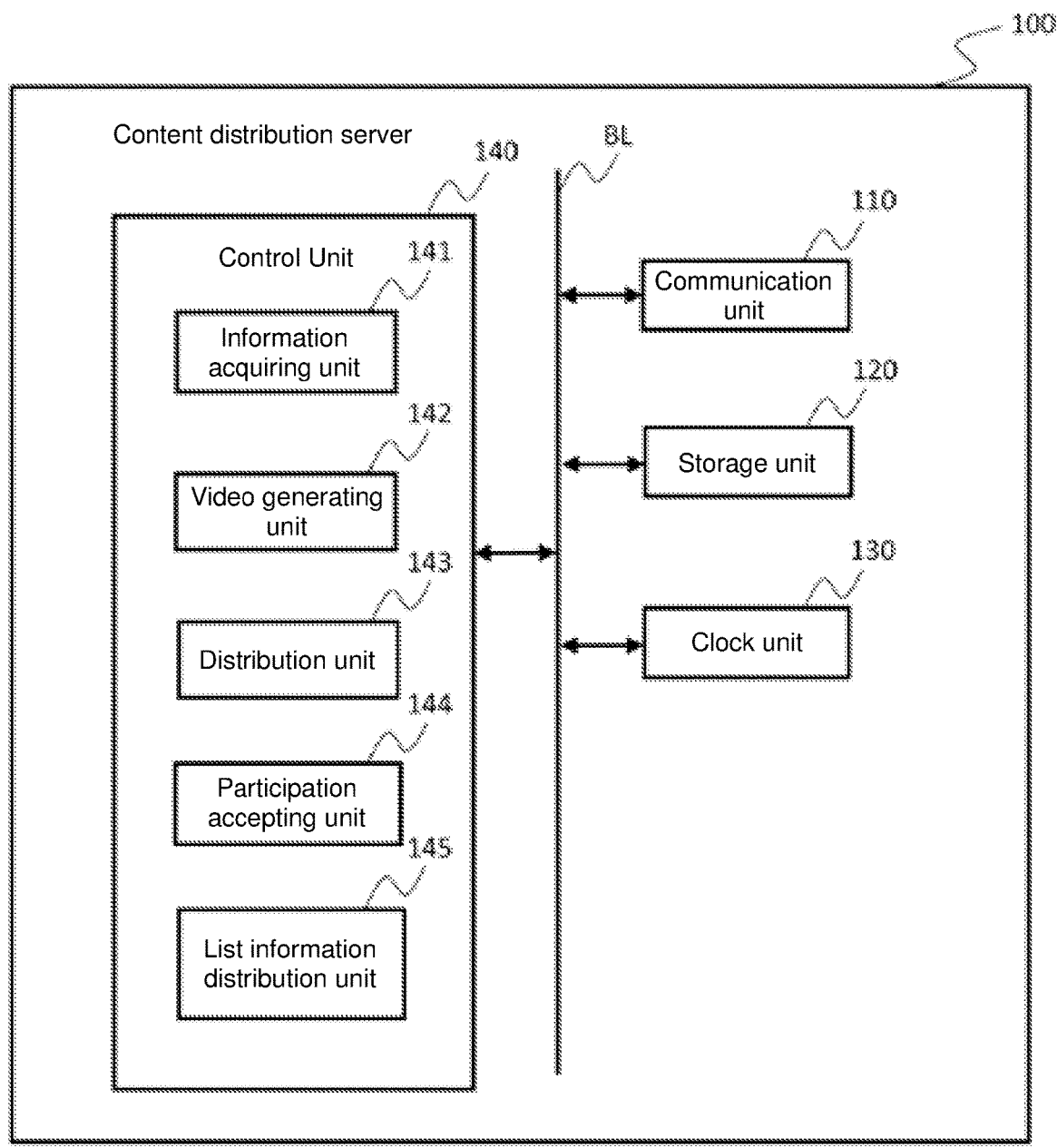

[Fig. 3]
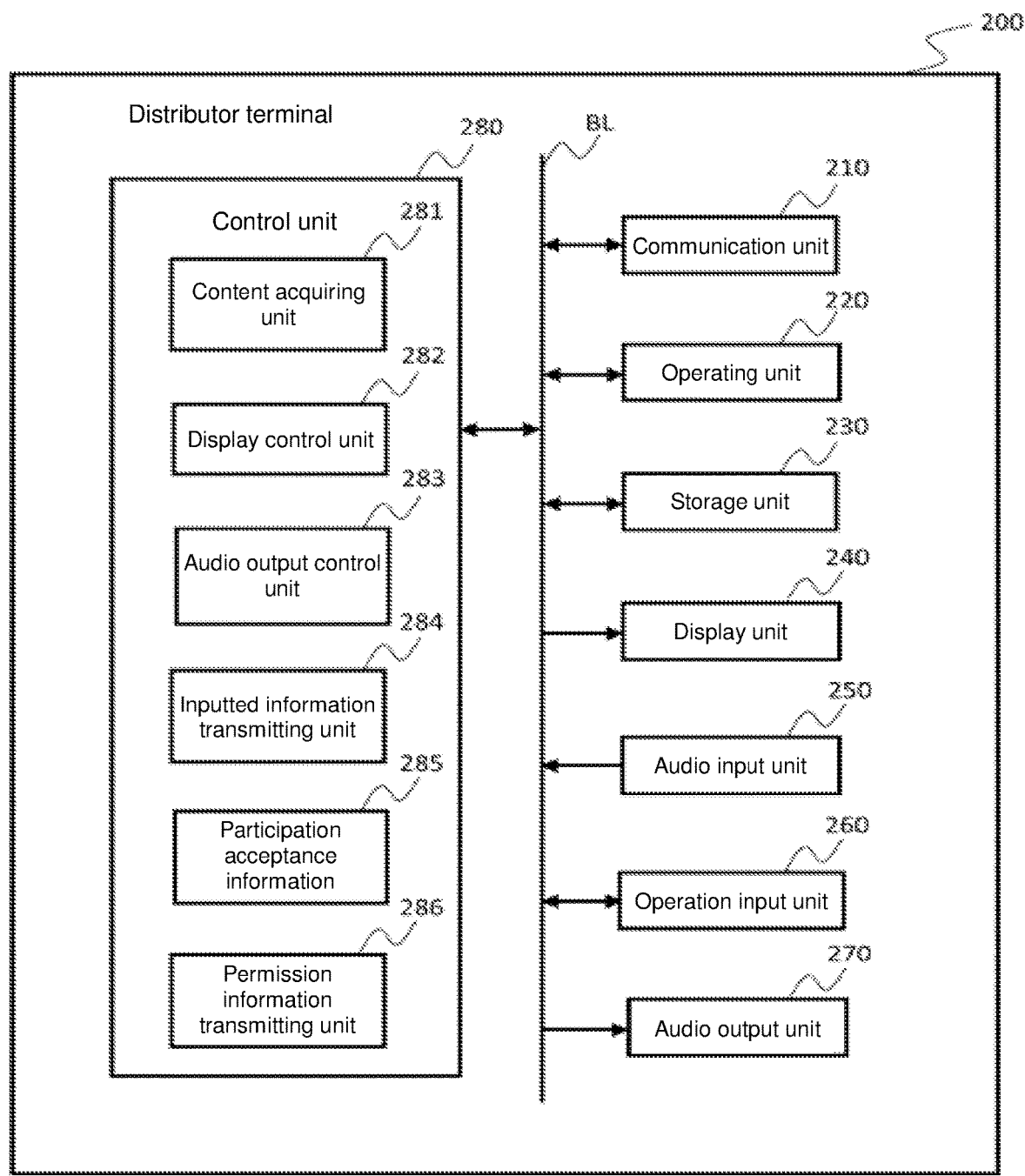

[Fig. 4]
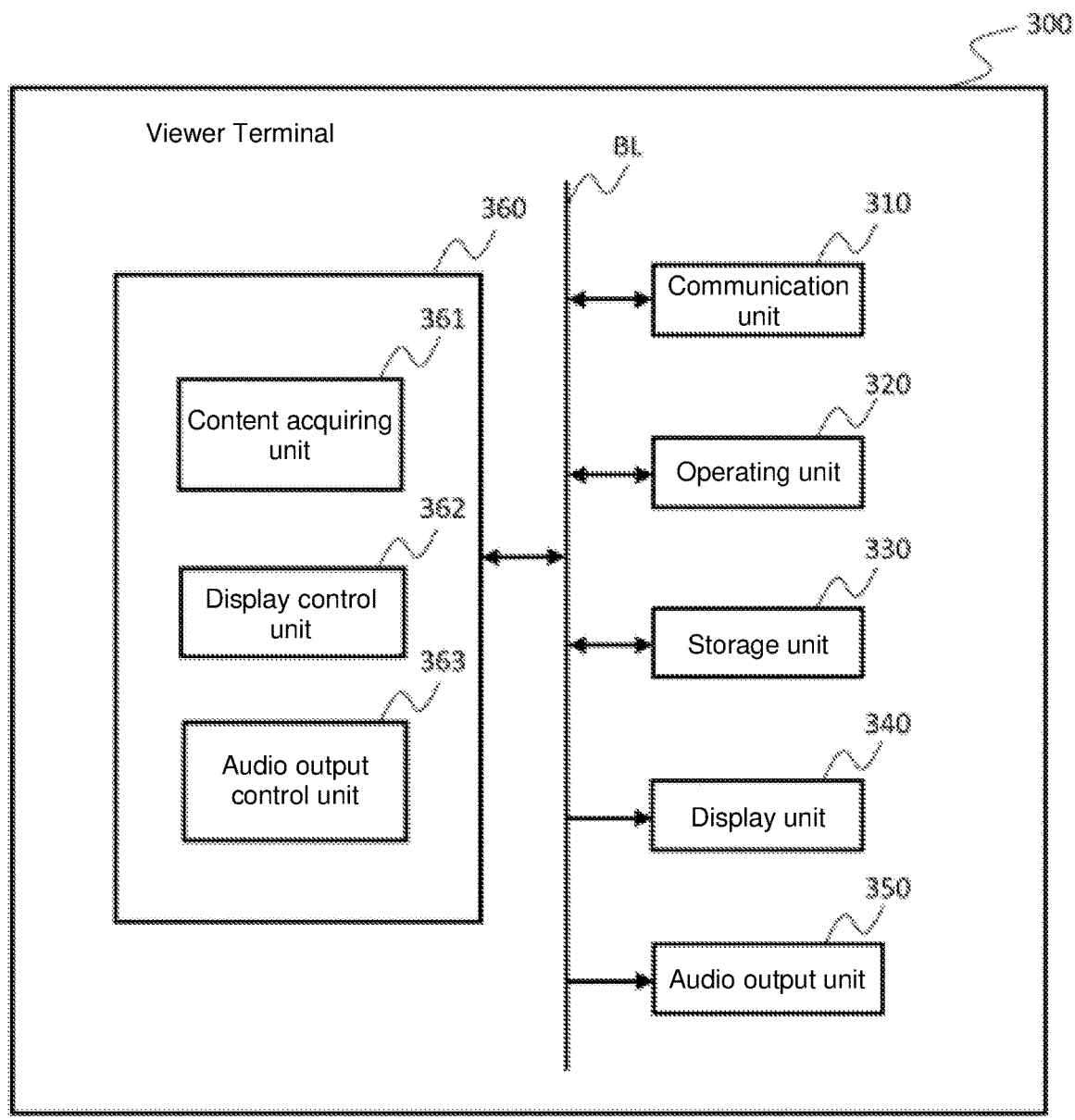

[Fig. 5]
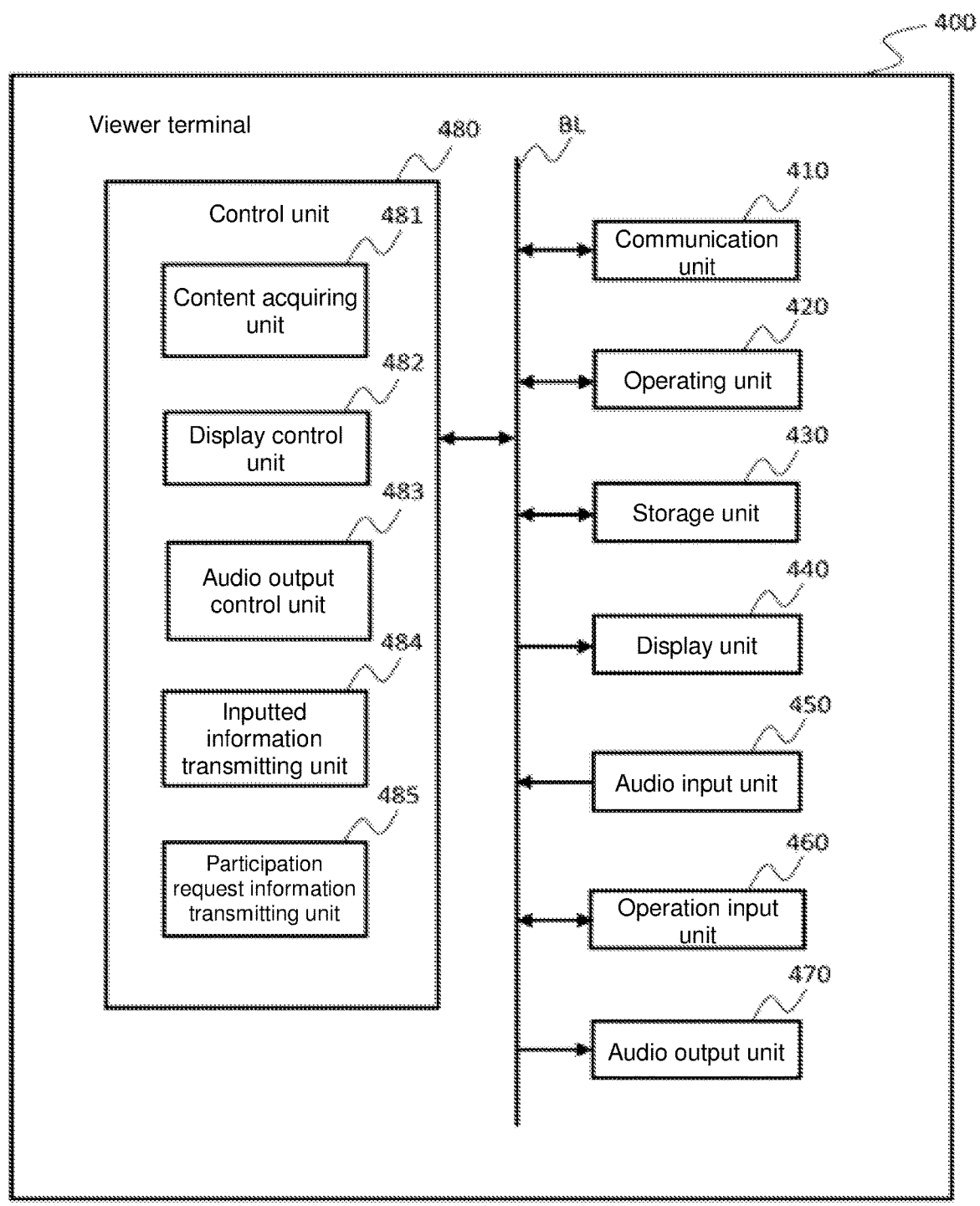

[Fig. 6]
(A)
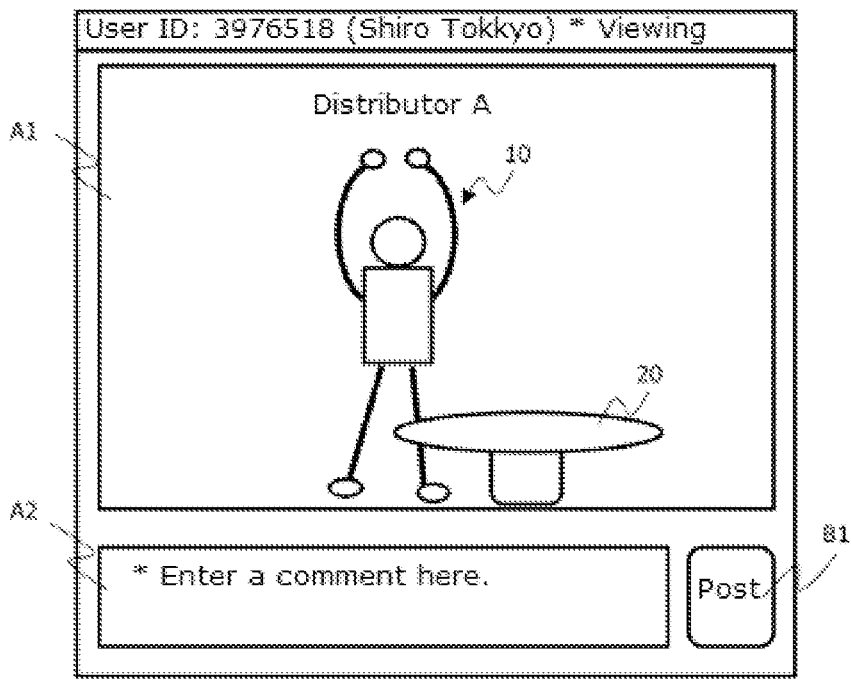
(B)
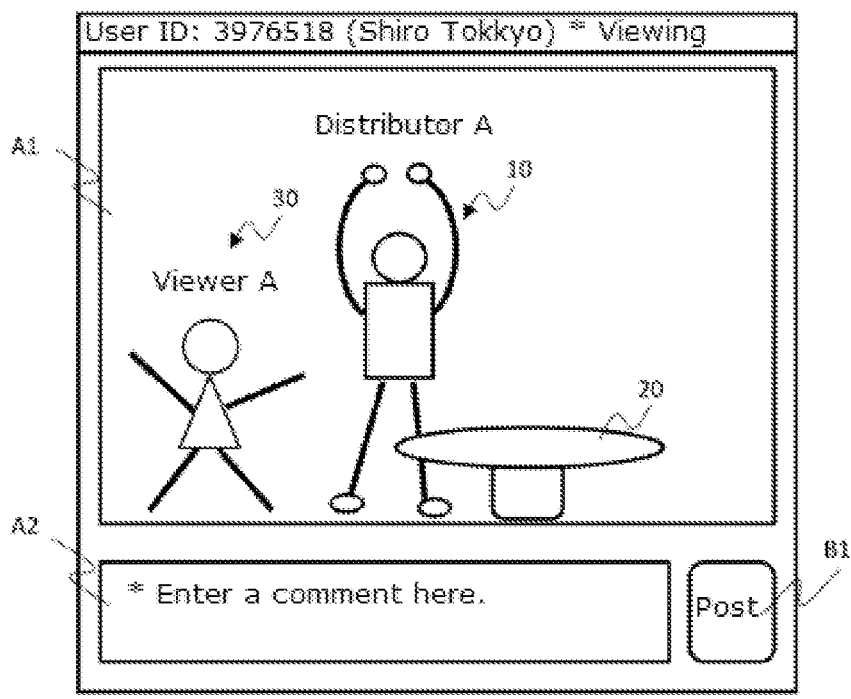

[Fig. 7]
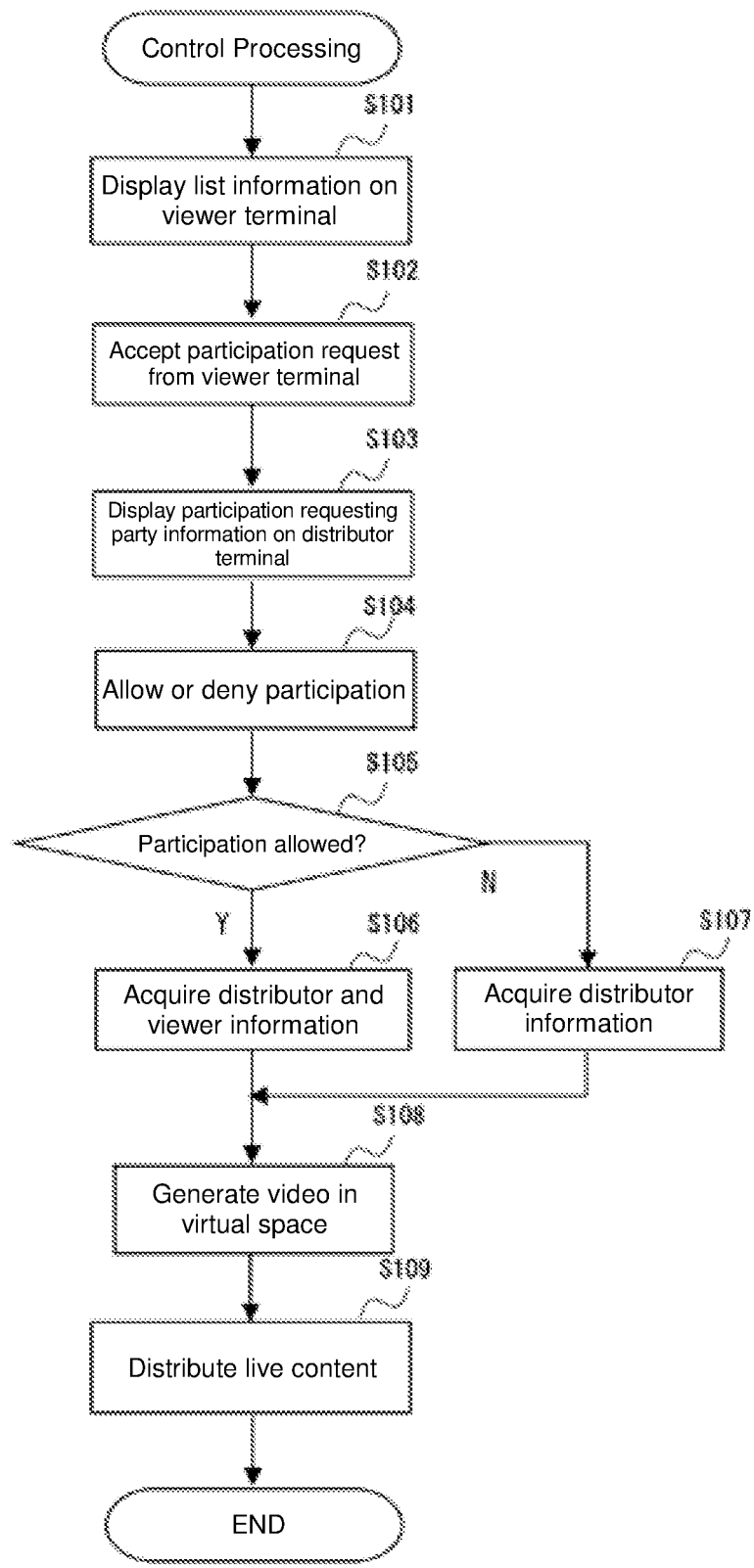

[Fig. 8]
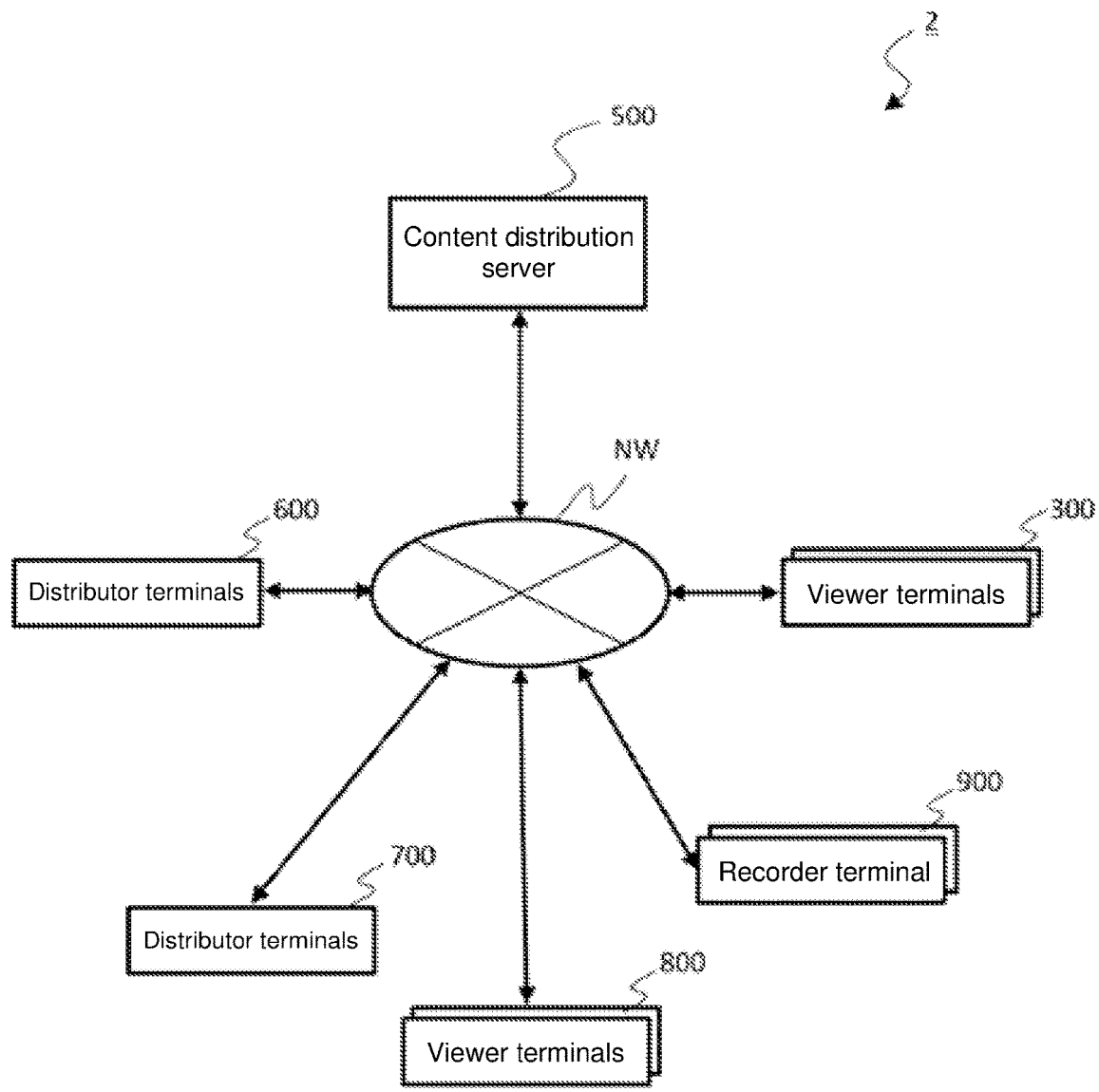

[Fig. 9]
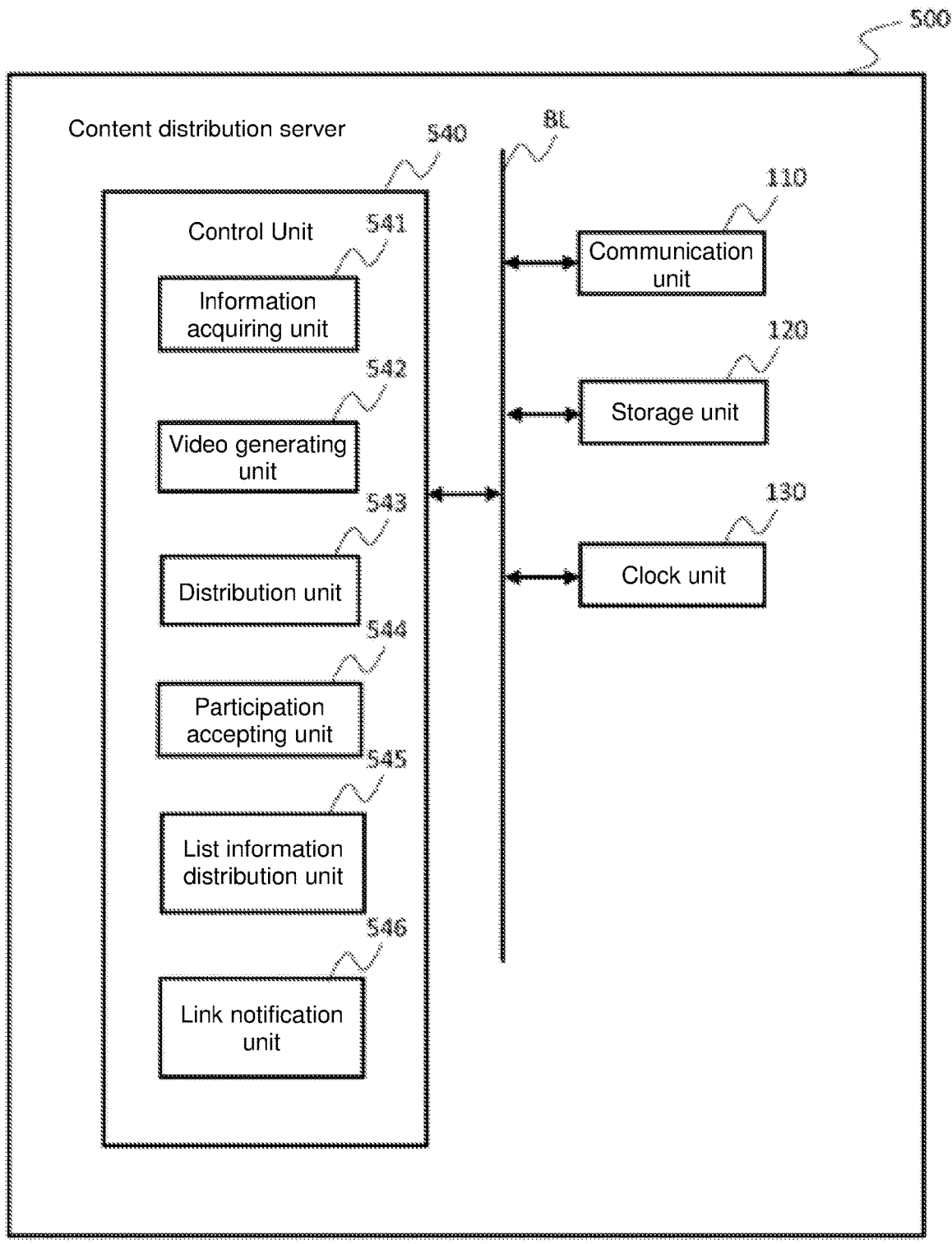

[Fig. 10]
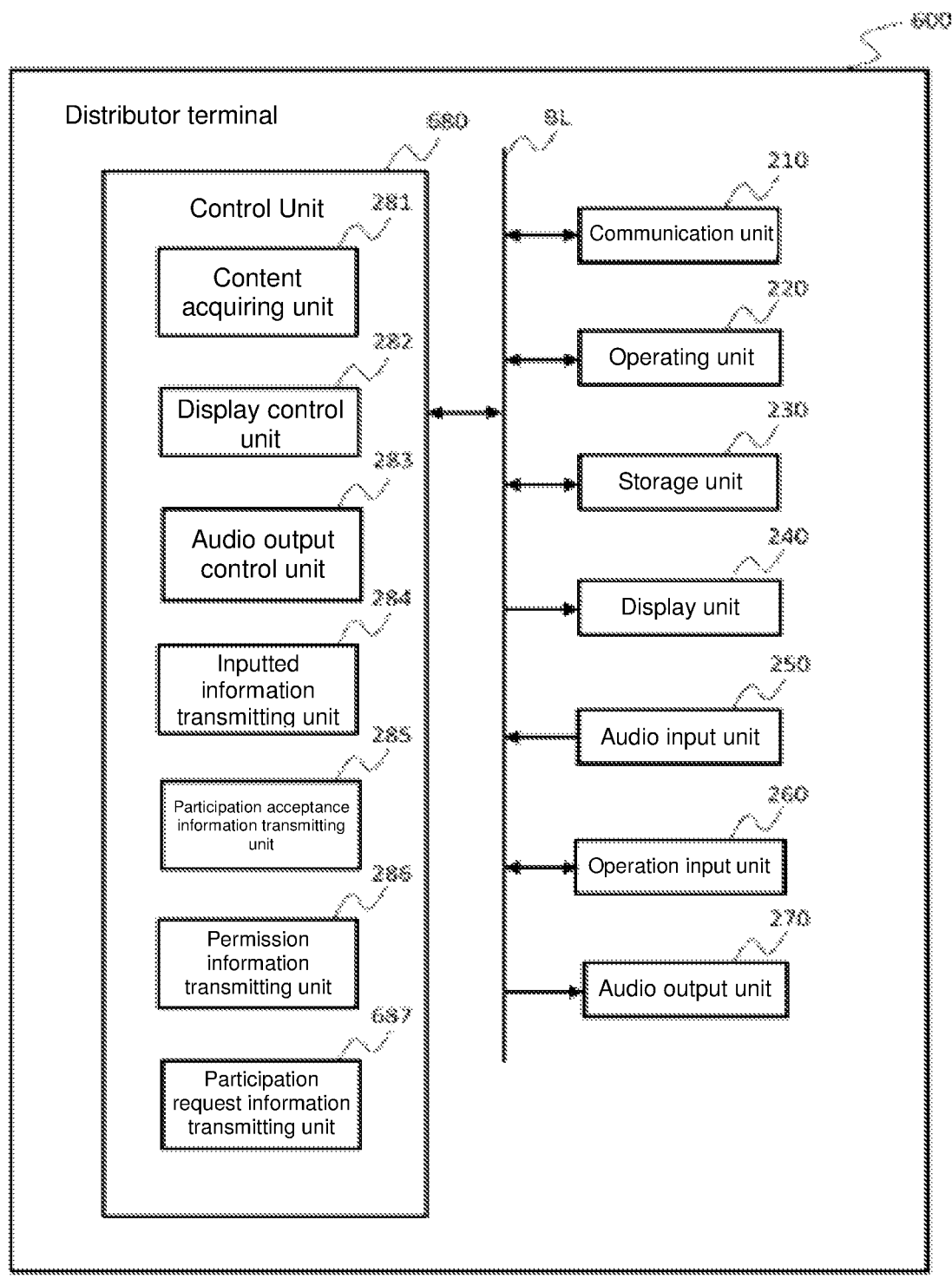

[Fig. 11]
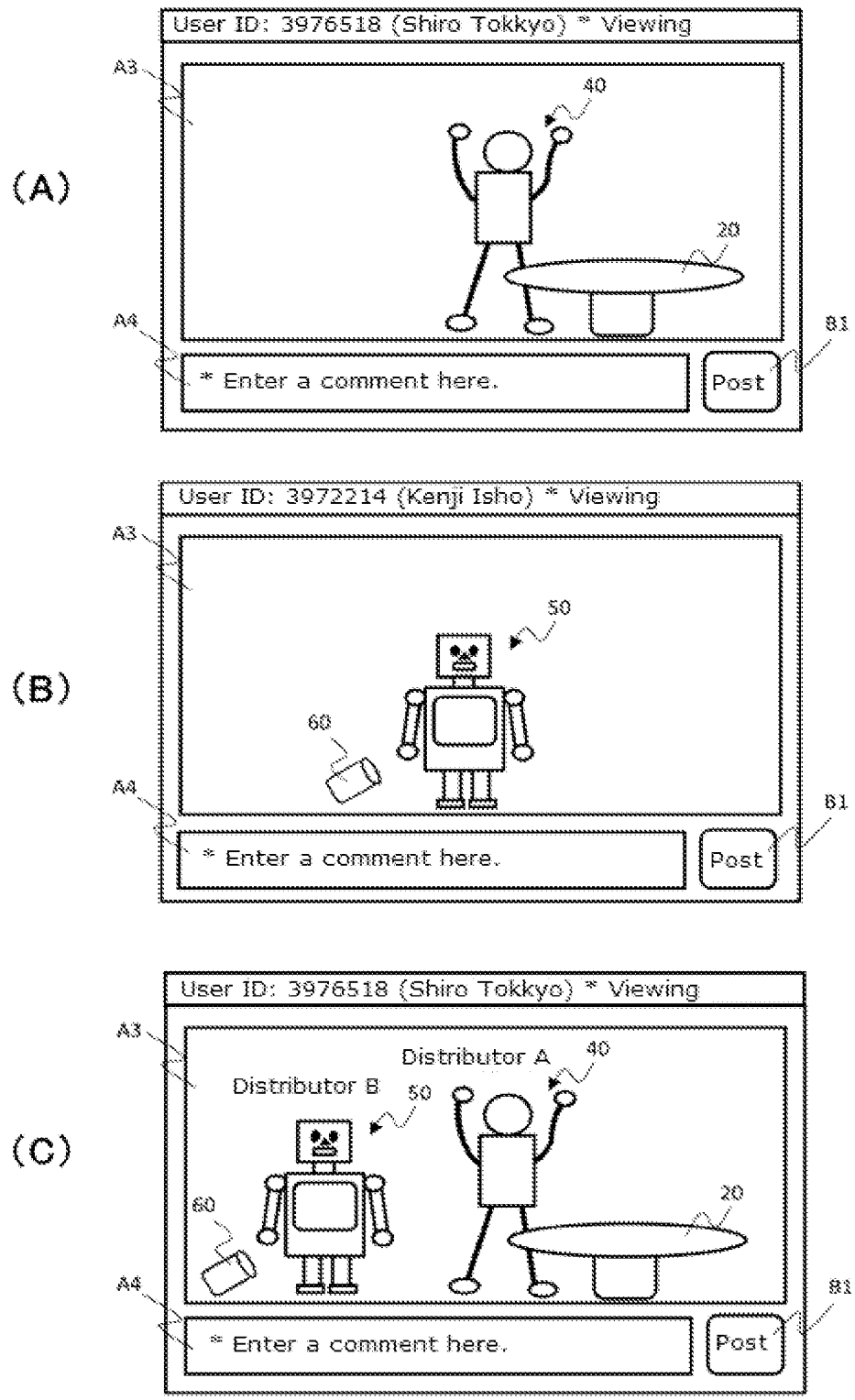

[Fig. 12]
(A)
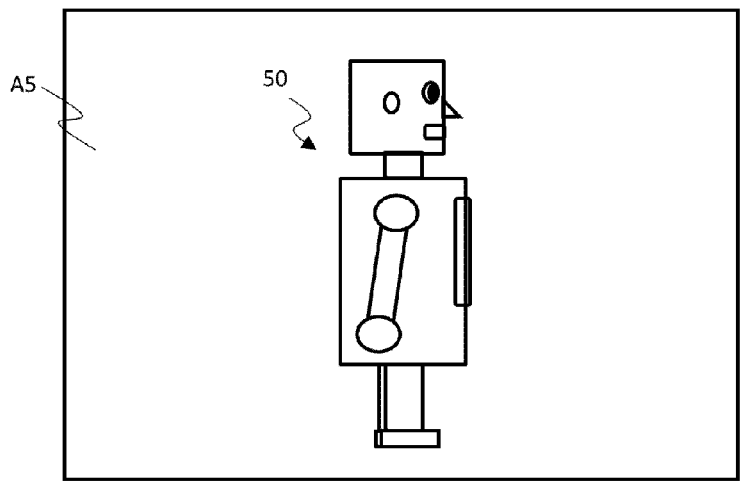
(B)
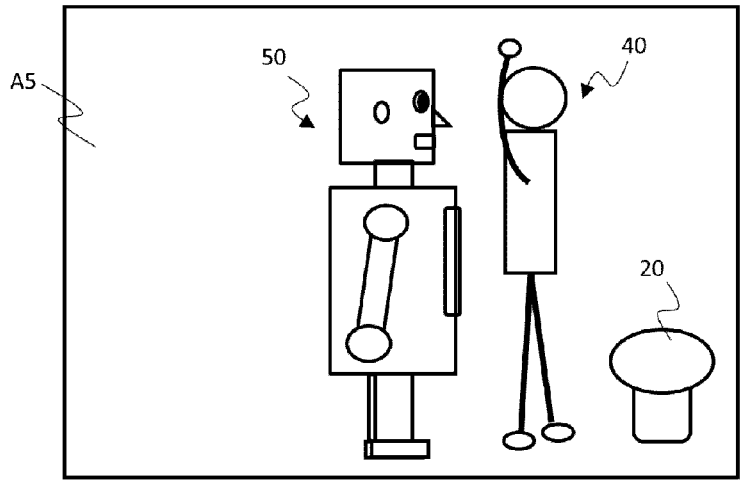

[Fig. 13]
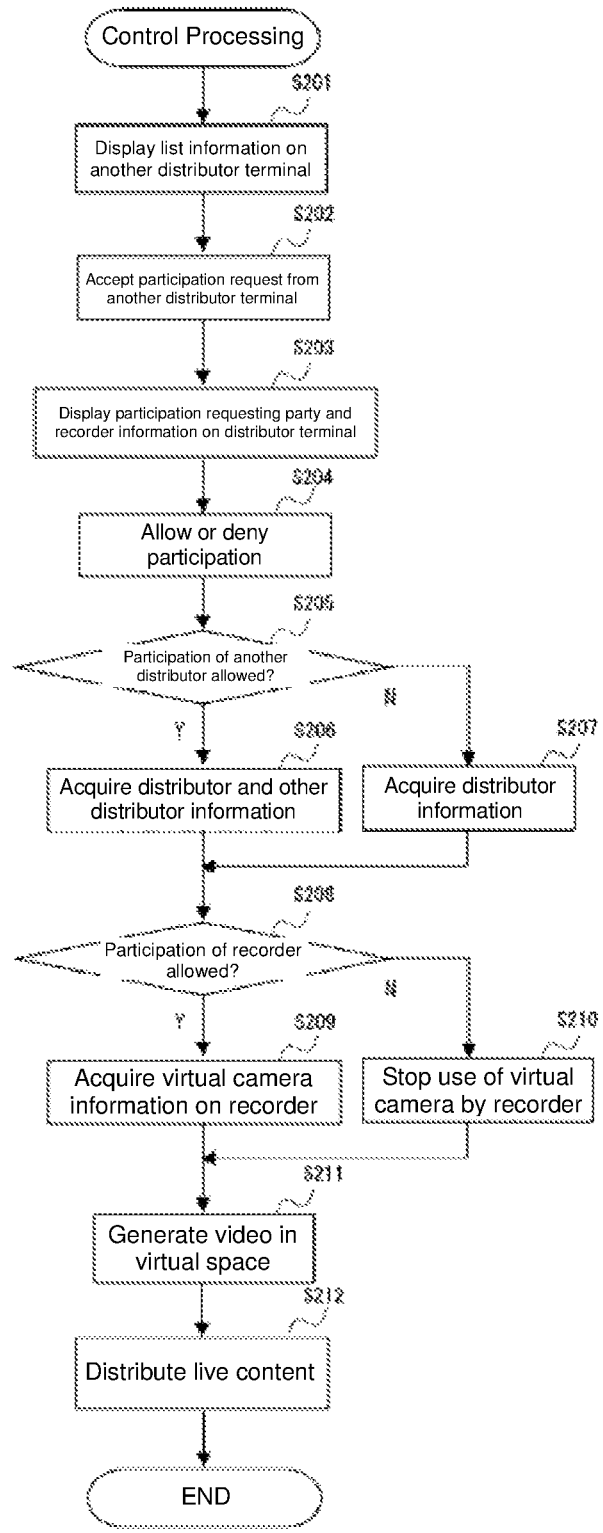

CONTENT DISTRIBUTION SERVER, CONTENT DISTRIBUTION SYSTEM, CONTENT DISTRIBUTION METHOD, AND PROGRAM

TECHNICAL FIELD

The present disclosure relates to a content distribution server, a content distribution system, a content distribution method, and a program.

BACKGROUND ART

In recent years, services that deliver live content via a network have become widespread as live broadcasting over the internet. Technologies have been proposed for live broadcasting over the internet in which the distributor appears as a virtual character (avatar) in virtual space in video that is distributed as live content. In this live content, video is distributed in which movements by the distributor are synthesized as movements by a virtual character using motion capture technology.

For example, a system is disclosed in Patent Document 1 in which performers and spectators wearing HMDs (head mounted displays) participate in games and video as virtual characters, and video captured from multiple viewpoints is distributed over multiple channels.

PRIOR ART DOCUMENTS

Patent Documents

Patent Document 1: JP 2002-271693 A

SUMMARY OF THE INVENTION

Problem to be Solved by the Invention

Patent Document 1 discloses a configuration in which a performer and a plurality of spectators gathered in the same place participate in the same virtual space as virtual characters. However, in this configuration, the performer and the plurality of spectators cannot participate in the same virtual space as virtual characters unless they gather in the same place, so this is not a convenient way get users to share a virtual space.

For example, in live broadcasting over the internet, a plurality of distributors may jointly create live content, and a plurality of distributors may jointly distribute video. For example, when a plurality of distributors gathered in the same place distribute video captured by a single camera, the distribution screen with a plurality of distributors captured at separate locations in real space is distributed using a split format or superposed format. However, when the distributors are separated in real space, each video is separate, and video in which they share the same location cannot be distributed.

Therefore, it would be desirable to be able to distribute video in which a plurality of distributors shared the same location via a network even when the plurality of distributors is separated from each other in real space. Even in live broadcasting over the internet in which the distributor appears as a virtual character in virtual space, there is demand for a function to realize such distributed content. Preferably, not only the distributor but also viewers who view the distributed content would be able to participate in the distributed content as virtual characters. A distributor and another distributor or a distributor and viewers could communicate in the same virtual space using a configuration that could realize such a function. There is also demand for a system that could deliver such a situation in the form of live content.

If the convenience of sharing virtual space could be improved, users could enter and exit a virtual space serving as a recording studio not only for simple video but also distributed programming, and users could also go from one virtual space serving as a recording studio to another virtual space serving as a recording studio.

In view of these circumstances, it is an object of the present disclosure to provide a content distribution server etc. that is able to increase the convenience of sharing virtual space.

Means for Solving the Problem

In order to achieve this object, a first aspect of the present invention is a content distribution server comprising: a participation accepting unit that accepts a participation request from another user into the virtual space used in distributed content from the distributor; an information acquiring unit that acquires motion information indicating movement by the distributor and a participant participating on the basis of the participation request, as well as information on the virtual characters of the distributor and the participant; and a distribution unit that distributes live content based on video in virtual space obtained by synthesizing motion information acquired by the information acquiring unit with movement by the virtual characters.

In order to achieve this object, a second aspect of the present invention is a content distribution system comprising: a content distribution server that accepts a participation request from another user into the virtual space used in distributed content from the distributor, and distributes live content based on video in virtual space obtained by synthesizing motion information indicating movement by the distributor and a participant participating on the basis of the participation request as the movement by the virtual characters of the distributor and the participant; a distributor terminal used by the distributor; and a viewer terminal used by a viewer who views the live content.

In order to achieve this object, a third aspect of the present invention is a content distribution method comprising: a participation accepting step of accepting a participation request from another user into the virtual space used in distributed content from the distributor; an information acquiring step of acquiring motion information indicating movement by the distributor and a participant participating on the basis of the participation request, as well as information on the virtual characters of the distributor and the participant; and a distribution step of distributing live content based on video in virtual space obtained by synthesizing motion information acquired in the information acquiring step with movement by the virtual characters.

In order to achieve this object, a fourth aspect of the present invention is a program causing a computer to function as a participation accepting means for accepting a participation request from another user into the virtual space used in distributed content from the distributor; an information acquiring means for acquiring motion information indicating movement by the distributor and a participant participating on the basis of the participation request, as well as information on the virtual characters of the distributor and the participant; and a distribution means for distributing live content based on video in virtual space obtained by synthesizing motion information acquired by the information acquiring means with movement by the virtual characters.

Effects of the Invention

The present disclosure is able to provide a content distribution server etc. that is able to increase the convenience of sharing virtual space.

BRIEF DESCRIPTION OF THE DRAWINGS

FIG. 1 is a diagram showing the configuration of the content distribution system in a first embodiment of the present invention.

FIG. 2 is a block diagram showing the configuration of the content distribution server in the first embodiment of the present invention.

FIG. 3 is a block diagram showing the configuration of the distributor terminal in the first embodiment of the present invention.

FIG. 4 is a block diagram showing the configuration of the viewer terminal in the first embodiment of the present invention.

FIG. 5 is a block diagram showing the configuration of the viewer terminal in the first embodiment of the present invention.

FIG. 6 is a diagram showing an example of a distribution screen displayed on the viewer terminal in the first embodiment of the present invention, where FIG. 6 (A) shows the distribution screen before the viewer participates, and FIG. 6 (B) shows the captured screen after the viewer participates.

FIG. 7 is a flowchart showing an example of control processing performed by the content distribution server in the first embodiment of the present invention.

FIG. 8 is a diagram showing the configuration of the content distribution system in a second embodiment of the present invention.

FIG. 9 is a block diagram showing the configuration of the content distribution server in the second embodiment of the present invention.

FIG. 10 is a block diagram showing the configuration of the distributor terminal in the second embodiment of the present invention.

FIG. 11 is a diagram showing an example of a distribution screen displayed on the viewer terminal in the second embodiment of the present invention, where FIG. 11 (A) shows the distribution screen of a distributor before another distributor participates, FIG. 11 (B) shows the distribution screen of the other distributor before the other distributor participates, and FIG. 11 (C) shows the captured screen after the other distributor participates.

FIG. 12 is a diagram showing an example of a screen captured by a virtual camera in the second embodiment, where FIG. 12 (A) shows the captured screen before another distributor participates, and FIG. 12 (B) shows the captured screen after the other distributor participates.

FIG. 13 is a flowchart showing an example of control processing performed by the content distribution server in the second embodiment of the present invention.

EMBODIMENTS OF THE INVENTION

The following is a description of embodiments of the present disclosure with reference to the drawings. It should be noted that the embodiments described below do not place any unreasonable limits on the content of the present disclosure described in the claims. In addition, not all of the components shown in the embodiments are essential components of the present disclosure. In the explanation of the first embodiment, a viewer participates. In the explanation of the second embodiment, another distributor participates.

1st Embodiment

As shown in FIG. 1, the content distribution system 1 in the present embodiment includes a content distribution server 100, one or more distributor terminals 200, one or more viewer terminals 300, and one or more viewer terminals 400. The content distribution server 100, distributor terminals 200, viewer terminals 300, and viewer terminals 400 are connected over a network NW so as to be able to communicate with each other. The network NW can be, for example, a WAN (World Area Network).

The content distribution server 100 provides a distribution service via the network NW. The content distribution server 100 distributes live content to the viewer terminals 300, 400 based on video in virtual space that synthesizes movements by the distributor as movements by a virtual character.

The video in virtual space includes not only virtual characters but also a background setting and objects appearing as virtual objects. Virtual space is basically three-dimensional space generated by CG (computer graphics). Note, however, that the virtual space may also be two-dimensional space. Distributors include the distributor who manages the distributed content and distributors who participate in the distributed content. Other distributors may include viewers who wish to participate, and distributors of other distributed content.

The distributor terminal 200 is used by a distributor who distributes live content. The distributor terminal 200 is a communication terminal provided with an HMD, and has a communication function and a motion capture function. The distributor terminal 200 acquires movement (gestures) and the line of sight of the distributor as motion information with the motion capture function. The motion information is reflected in the movement of the virtual character associated with the distributor and the viewpoint (that is, rendering) in video within virtual space. The motion information may include data indicating the facial expressions of the distributor.

The viewer terminal 300 is a device having a communication function such as a personal computer, a tablet terminal, or a smartphone. The viewer terminal 300 is a communication terminal that does not have a function for participating in distributed content as a virtual character. The viewer terminal 300 is used by a viewer to view live content.

The viewer terminal 400 is a communication terminal provided with an HMD and has a communication function and a motion capture function. The viewer terminal 400 acquires movement (gestures) and the line of sight of the distributor as motion information with the motion capture function. The motion information is reflected in the movement of the virtual character associated with the distributor and the viewpoint (that is, rendering) in video within virtual space. The motion information may include data indicating the facial expressions of the distributor.

Unlike the viewer terminal 300, the viewer terminal 400 has a configuration for the viewer to participate in distributed content as a virtual character. In the present embodiment, among the viewer terminals 400, one or more of the viewer terminals 400 is a communication terminal used by a participant.

<Configuration of Content Distribution Server>

The configuration of the content distribution server 100 will now be described in detail. As shown in FIG. 2, the content distribution server 100 includes a communication unit 110 that communicates with other devices, a storage unit 120 that stores various types of data, a clock unit 130 that keeps time, and a control unit 140 for controlling the entire device. These components are connected to each other via a bus line BL.

The communication unit 110 is a communication interface including an NIC (Network Interface Card) controller for performing wired communication or wireless communication. The communication unit 110 communicates with a distributor terminal 200 and a viewer terminal 300, 400 via a network NW.

The storage unit 120 is composed, for example, of RAM (random access memory) and ROM (read only memory). The storage unit 120 stores programs and various types of data etc. for executing various types of control processing.

The clock unit 130 can include, for example, an oscillation circuit for generating clock signals, a variable PLL (phase locked loop), and a counter circuit for counting the number of clock signal pulses. The clock unit 130 keeps the time based on the number of pulses counted.

The control unit 140 is composed of a CPU (central processing unit) etc. The control unit 140 controls the entire operation of the content distribution server 100 by executing a program stored in the storage unit 120. The control unit 140 executes various controls on timing based on the number of pulses counted by the clock unit 130. The control unit 140 also counts the elapsed time from the start of the live content based on the time kept by the clock unit 130, and determines whether or not a predetermined time (for example, the scheduled distribution time) has elapsed.

The functional configuration of the control unit 140 will now be described. The control unit 140 functions as an information acquiring unit 141, a video generating unit 142, a distribution unit 143, a participation accepting unit 144, and a list information distribution unit 145.

The information acquiring unit 141 acquires information on the virtual character used by the distributor from the distributor terminal 200 and motion information indicating the movement and line of sight of the distributor via the communication unit 110. The information acquiring unit 141 also acquires information related to the virtual character used by a participant who participates in the distributed content and acquires motion information indicating the movement and line of sight of the participant from the viewer terminal 400 used by a viewer (participant) via the communication unit 110. The information acquiring unit 141 acquires audio information from the distributor terminal 200 and the viewer terminal 400 via the communication unit 110.

A user can acquire, for example, information on the virtual character to be used by downloading the information from an external device. The user can upload information on the virtual character to be used to the content distribution server 100 and use the virtual character in distributed content. Virtual character information may also be provided from the content distribution server 100. For example, the user may select one of a plurality of virtual character information stored in the content distribution server 100, and use that virtual character.

The video generating unit 142 generates video in virtual space that synthesizes the movement by the distributor and a participant as movement by the virtual character. The synthesis can be realized, for example, by generating video in which the virtual characters are present against a predetermined virtual space serving as the background, and generating video so that the virtual characters reflect movements by the distributors or participants using the virtual characters.

The distribution unit 143 distributes live content based on the video generated by the video generating unit 142. Live content based on the generated video is information indicating video rendered from each viewpoint relative to the generated video data. Specifically, the live content contains information indicating video in which the generated video is viewed from the viewpoint of the virtual character of the distributor and video (a distribution screen) in which the generated video is viewed from the viewpoint of the virtual camera for distribution.

The live content distributed by the distribution unit 143 includes not only information indicating video but also audio information. The distribution unit 143 distributes audio information acquired by the information acquiring unit 141 and audio information stored in the storage unit 120 in advance and used in the production as live content.

The participation accepting unit 144 acquires participation acceptance information from a distributor terminal 200 via the communication unit 110. When the participation accepting unit 144 acquires participation acceptance information, the participation accepting unit 144 accepts the request from another person to participate in the virtual space used by the distributor of the distributed content. The other person in the present embodiment is a viewer. The participation accepting unit 144 may accept participation requests during distribution of the content by the distributor, or may accept participation requests before distribution of the distributed content starts.

The participation accepting unit 144 acquires information from the other person who wishes to participate and displays the information on the distributor terminal 200 being used to produce the distribution content in which the other person wishes to participate. The information from the other person can be, for example, information indicating a user name or a virtual character. The participation accepting unit 144 displays a screen for permitting or denying the participation of another person who wishes to participate in distributed content on the distributor terminal 200 being used to produce the distribution content in which the other person wishes to participate.

In this case, a participation URL used to participate in distributed content may be transmitted to a viewer terminal 400 that is allowed to participate. The participation accepting unit 144 may also display on the distributor terminal 200 a screen for transmitting the participation URL to the communication terminal of another person who wishes to participate. In this case, the participation URL may be transmitted by the distributor instead of granting permission to participate (using the permission information transmitting operation described later).

The list information distribution unit 145 distributes list information for the distributed content in which the participant wishes to participate based on the participation acceptance information acquired by the participation accepting unit 144 from one or more distributor terminals 200. Specifically, the list information distribution unit 145 displays via the communication unit 110 on the communication terminal of another viewer a screen showing list information for the distributed content in which the participants wish to participate. In the present embodiment, the communication terminals of other people are the viewer terminals 300, 400. However, the list information distribution unit 145 may display this screen only on viewer terminals 400 that have a configuration for participating in the distributed content.

<Configuration of Distributor Terminal>

The configuration of the distributor terminal 200 will now be described in detail. As shown in FIG. 3, the distributor terminal 200 includes a communication unit 210 for communicating with other devices, an operating unit 220 for receiving user operations, a storage unit 230 for storing various types of data, a display unit 240 for displaying various types of images, an audio input unit 250 for receiving audio input, an operation input unit 260 for inputting motion information, an audio output unit 270 for outputting various types of audio, and a control unit 280 for controlling the entire device. These components are connected to each other via a bus line BL.

The communication unit 210 is a communication interface including an NIC for conducting wired communication or wireless communication. The communication unit 210 communicates with the content distribution server 100 via the network NW.

The operating unit 220 can include, for example, operation buttons, a keyboard, and a pointing device, and is an interface used by the user to input instructions.

The storage unit 230 can be, for example, RAM or ROM. The storage unit 230 stores programs and inputted data for executing various types of control processing.

The display unit 240 can be, for example, an LCD (liquid crystal display) or an EL (electroluminescence) display. The display unit 240 displays text, images, etc. based on data inputted from the control unit 280.

The audio input unit 250 can be, for example, a microphone. The audio input unit 250 receives audio inputted from the outside to obtain audio information.

The operation input unit 260 receives input operations from the user as user motion information. The operation input unit 260 can be, for example, a camera or a sensor for acquiring motion information using a motion capture technology. Motion information can be detected by, for example, a sensor that senses the user's line of sight and movements (gestures). Motion information may also be acquired, for example, by pressing a button to express a facial expression on the virtual character or perform a predetermined act.

The process of converting motion information from the user into movement by or a change in the line of sight of the virtual character may be executed by the distributor terminal 200, the content distribution server 100, or the content distribution server 100 and the distributor terminal 200 working together.

The audio output unit 270 can be composed of, for example, a speaker and an amplifier. The audio output unit 270 outputs audio according to data inputted from the control unit 280.

The control unit 280 can be, for example, a CPU. The control unit 280 controls the entire operation of the distributor terminal 200 by executing a program stored in the storage unit 230.

The functional configuration of the control unit 280 will now be described. The control unit 280 functions as a content acquiring unit 281, a display control unit 282, an audio output control unit 283, an inputted information transmitting unit 284, a participation acceptance information transmitting unit 285, and a permission information transmitting unit 286.

The content acquiring unit 281 acquires data indicating live content from the content distribution server 100 via the communication unit 210. The display control unit 282 displays video in virtual space on the display unit 240 based on the data indicating live content acquired by the content acquiring unit 281. The audio output control unit 283 outputs audio from the audio output unit 270 based on the data indicating live content acquired by the content acquiring unit 281.

The inputted information transmitting unit 284 transmits audio information acquired by the audio input unit 250 and motion information acquired by the operation input unit 260 to the content distribution server 100. The inputted information transmitting unit 284 may transmit the information to the content distribution server 100 after reflecting the motion information in the virtual character.

The participation acceptance information transmitting unit 285 transmits the participation acceptance information established by the user to the content distribution server 100 via the communication unit 210. The participation acceptance information is information indicating that participation in distributed content is requested, and can include, for example, information such as the scheduled distribution time, the number of people invited, and details on the distributed content.

The permission information transmitting unit 286 transmits permission information to the content distribution server 100 via the communication unit 210 in response to a permission information transmitting operation performed by the user. Permission information is information indicating whether a request from another person to participate has been permitted or denied.

<Configuration of Viewer Terminal>

The configuration of the viewer terminal 300 will now be described in detail. As shown in FIG. 4, the viewer terminal 300 includes a communication unit 310 for communicating with other devices, an operating unit 320 for receiving user input operations, a storage unit 330 for storing various types of data, a display unit 340 for displaying various types of images, an audio output unit 350 for outputting audio, and a control unit 360 for controlling the entire device. These components are connected to each other via a bus line BL.

The communication unit 310 is a communication interface including an NIC for conducting wired communication or wireless communication. The communication unit 310 communicates with the content distribution server 100 via the network NW.

The operating unit 320 can include, for example, operation buttons, a keyboard, and a pointing device, and is an interface used by the user to input instructions.

The storage unit 330 can be, for example, RAM or ROM. The storage unit 330 stores programs and inputted data for executing various types of control processing.

The display unit 340 can be, for example, an LCD (liquid crystal display) or an EL (electroluminescence) display. The display unit 340 displays text, images, etc. based on data inputted from the control unit 360.

The audio output unit 350 can be composed of, for example, a speaker and an amplifier. The audio output unit 350 outputs audio according to data inputted from the control unit 360.

The control unit 360 can be, for example, a CPU. The control unit 360 controls the entire operation of the viewer terminal 300 by executing a program stored in the storage unit 330.

The functional configuration of the control unit 360 will now be described. The control unit 360 functions as a content acquiring unit 361, a display control unit 362, and an audio output control unit 363.

The content acquiring unit 361 acquires data indicating live content from the content distribution server 100 via the communication unit 310. The display control unit 362 displays video in virtual space on the display unit 340 based on the data indicating live content acquired by the content acquiring unit 361. The audio output control unit 363 outputs audio from the audio output unit 350 based on the data indicating live content acquired by the content acquiring unit 361.

The configuration of the viewer terminal 400 will now be described in detail. As shown in FIG. 5, the viewer terminal 400 includes a communication unit 410 for communicating with other devices, an operating unit 420 for receiving user input operations, a storage unit 430 for storing various types of data, a display unit 440 for displaying various types of images, an audio input unit 450 for inputting audio, an operation input unit 460 for inputting motion information, an audio output unit 470 for outputting various types of audio, and a control unit 480 for controlling the entire device. These components are connected to each other via a bus line BL.

The configuration of the viewer terminal 400 is basically the same as the configuration of the distributor terminal 200. For example, the viewer terminal 400 has a function for acquiring motion information of the viewer as the information necessary for the viewer to participate in the distributed content, and transmitting the motion information to the content distribution server 100 in order to reflect it in the movement of the virtual character for the viewer.

However, the control unit 480 in the viewer terminal 400 differs from the one in the distributor terminal 200 in that a participation request information transmitting unit 485 is provided instead of a participation acceptance information transmitting unit 285 and a permission information transmitting unit 286. Specifically, the control unit 480 in the viewer terminal 400 functions as a content acquiring unit 481, a display control unit 482, an audio output control unit 483, an inputted information transmitting unit 484, and a participation request information transmitting unit 485.

The functions of the content acquiring unit 481, the display control unit 482, the audio output control unit 483, and the inputted information transmitting unit 484 are basically the same as the functions of the content acquiring unit 281, the display control unit 282, the audio output control unit 283, and the inputted information transmitting unit 284 in the control unit 280 of the distributor terminal 200. The display control unit 482 acquires the list information distributed by the content distribution server 100 via the communication unit 410, and displays on the display unit 440 a screen showing the list information of the distributed content for which participation requests will be accepted.

The participation request information transmitting unit 485 transmits participation request information indicating a participation request to the content distribution server 100 via the communication unit 410. Specifically, the participation request information transmitting unit 485 transmits participation request information when the user wishes to participate in response to a screen showing list information of the distributed content for which participation requests are accepted.

<Specific Example of Distribution Screens>

Specific examples of video and distribution screens displayed based on information indicating that live content is being streamed will now be described.

FIG. 6 is a diagram showing an example of a distribution screen displayed on the viewer terminal 300 in the first embodiment of the present invention. FIG. 6 (A) shows the distribution screen before the viewer participates, and FIG. 6 (B) shows the captured screen after the viewer participates.

In area A1, video rendered from the viewpoint of a virtual camera (not shown) is displayed as video in virtual space. A field for comments posted by viewers is displayed in area A2, and a post button B1 is displayed to the right of the comment field.

In FIG. 6 (A), a virtual character 10 indicating the distributor A is displayed in the video shown in area A1. Distributor A is the distributor who is distributing the distributed content using the distributor terminal 200. An object 20 indicating a table as a virtual object is also displayed in this video.

When distributor A has allowed viewer A, who is a viewer using any one of the viewer terminals 400, to participate, the viewer terminal 400 transmits information indicating the virtual character used by viewer A and motion information of viewer A to the content distribution server 100.

As a result, as shown in FIG. 6 (B), a virtual character 30 indicating viewer A is displayed in area A1 and appears in the distribution screen. The virtual character 30 of viewer A, who is a participant, enters the virtual space used by distributor A to produce distributed content when participation is permitted. However, the virtual character 30 does not appear in area A1 of the distribution screen unless it is within the range of the virtual camera.

The distribution unit 143 in the content distribution server 100 displays viewer A, who is a participant, and distributor A on the viewer terminal 300 in a manner in which they can be distinguished from one another. For example, in area A1 of the distribution screen in FIG. 6 (B), a character string for distributor A indicating a user name is displayed above the virtual character 10 for distributor A. A character string for viewer A indicating a user name is also displayed above the virtual character 30 for viewer A.

The method used to distinguish virtual characters appearing on the distribution screen from each other is not limited to this method. For example, the distribution unit 143 may display the virtual characters of the distributor and/or the participants using a frame or a color to distinguish them from one another. The distribution unit 143 may also display the virtual characters of the distributor and/or the participants with an identifying mark nearby to distinguish them from one another.

The distribution screen shown in FIG. 6 is basically the one displayed on the viewer terminal 300. However, a similar distribution screen may be displayed on the viewer terminal 400 used by a viewer who is not a participant. Only the video in area A1 may be displayed on a viewer terminal 400 used by a viewer who is not a participant. Video in virtual space rendered from the perspective of each virtual character (that is, virtual character 10 or virtual character 30) is displayed on the distributor terminal 200 or the viewer terminal 400 used by the participant, instead of the distribution screen shown in FIG. 6.

<Processing Flow>

An example of control processing executed by the content distribution server 100 will now be described with reference to FIG. 7. This processing is executed when the content distribution server 100 has acquired participation acceptance information from one or more distributor terminals 200.

First, the list information distribution unit 145 in the control unit 140 displays a screen indicating list information on distributed content that is accepting participation requests on viewer terminals 300, 400 based on the participation acceptance information acquired from one or more distributor terminals 200 (step S101). When participation acceptance information is acquired from a plurality of distributor terminals 200, the list information distribution unit 145 distributes list information via the communication unit 110 to viewer terminals 300, 400 capable of browsing through the list.

The participation accepting unit 144 in the control unit 140 accepts a request from another person to participate in the virtual space used by the distributor to produce distributed content (step S102). Specifically, the participation accepting unit 144 acquires the participation acceptance information transmitted from the participation request information transmitting unit 485 in a viewer terminal 400 via the communication unit 110.

The participation accepting unit 144 in the control unit 140 acquires information on another person who wants to participate (that is, a participation requesting party), and displays the information on the distributor terminal 200 used to produce the distributed content in which the person wishes to participate (step S103). In addition, the participation accepting unit 144 displays a screen for permitting or denying the participation of another person who wishes to participate on the distributor terminal 200, and accepts permission or denial of participation (step S104).

Here, the control unit 140 determines whether or not the distributor has permitted participation (step S105). Specifically, the control unit 140 determines whether or not the distributor has permitted participation based on the permission information acquired from the permission information transmitting unit 286 in the distributor terminal 200.

When participation is denied (step S105; N), the information acquiring unit 141 in the control unit 140 acquires various types of information on the distributor from the distributor terminal 200 that is used to produce the distributed content (step S107). In other words, when there are no participants, the content distribution server 100 acquires only information on the virtual character of the distributor and motion information, and then performs steps S108 and S109.

When participation is permitted (step S105; Y), the information acquiring unit 141 in the control unit 140 receives various types of information on the distributor from the distributor terminal 200 that is used to produce the distributed content and various types of information on viewers participating in the distributed content (step S106). In other words, the content distribution server 100 acquires virtual character information and motion information on the distributor and the participants, and then performs steps S108 and S109.

The video generating unit 142 in the control unit 140 generates video in virtual space in which motion information acquired by the information acquiring unit 141 is synthesized as the movement of the virtual character (step S108).

The distribution unit 143 in the control unit 140 distributes live content based on the video generated by the video generating unit 142 (step S109). In this way, video from the viewpoint of the virtual character of the distributor is displayed on the distributor terminal 200, and video from the viewpoint of the virtual character of a viewer is displayed on the viewer terminal 400 participating in the distributed content. The distribution screen is displayed on the viewer terminals 300, 400 of the viewers who are not participating in the distributed content.

The control process executed by the content distribution server 100 was described above. However, the processing flow is not limited to this particular flow. For example, when accepting participation while the distributor is producing distributed content, the distributor may execute the processing in steps S107, S108, and S109 before step S101. Instead of step S104, which is processing performed to reflect the decision of the distributor to allow participation, a process of automatically granting participation to a predetermined number of requesting parties may be executed on a first-come-first-served basis.

<Explanation of Effects>

In the content distribution system 1 of the present embodiment, the content distribution server 100 accepts requests from viewers to participate in distributed content via the network. In this case, the distributor and viewers can share virtual space as their respective virtual characters in the production of distributed content even when they are separated from each other in real space. Therefore, the content distribution system 1 in the present embodiment is able to increase the convenience of sharing virtual space.

2nd Embodiment

In the present embodiment, the content distribution system 2 in a second embodiment will be described. In the following description, the components identical to those in the content distribution system 1 of the first embodiment are denoted by the same reference numbers. The configuration of content distribution system 1 and the configuration of content distribution system 2 can be combined when appropriate as long as there are no technical contradictions.

For example, content distribution system 1 is a configuration in which viewers participate in distributed content, and content distribution system 2 is a configuration in which other distributors participate in distributed content. Therefore, by combining these configurations, a configuration can be realized in which both viewers and other distributors participate.

As shown in FIG. 8, the content distribution system 2 in the present embodiment includes a content distribution server 500, a distributor terminal 600 used by a distributor, a distributor terminal 700 used by another distributor, and one or more viewer terminals 300, one or more viewer terminals 800, and one or more recorder terminals 900. Each of these devices is connected via a network NW in order to be able to communicate with each other. The network NW can be, for example, a WAN.

The content distribution server 500 provides distribution services via the network NW. The content distribution server 100 distributes live content to the viewer terminals 300, 800 based on video in virtual space that synthesizes the movement of the distributor as the movement of a virtual character. When there are participants who participate in the distributed content along with the distributor, the video in virtual space further synthesizes the movements of the participants as the movements of the virtual characters of the participants.

The distributor terminals 600, 700 are used by distributors who distribute live content. The distributor terminals 600, 700 are communication terminals provided with an HMD, and have a communication function and a motion capture function. The distributor terminals 600, 700 acquire movement (gestures) and the line of sight of the distributors as motion information with the motion capture function. The motion information is reflected in the movement of the virtual characters associated with the distributors and the viewpoint (that is, rendering) in video within virtual space. The motion information may include data indicating the facial expressions of the distributors.

The viewer terminals 300, 800 are devices having a communication function such as a personal computer, a tablet terminal, or a smartphone. The viewer terminals 300, 800 are communication terminals that do not have a function for participating in distributed content as a virtual character. The viewer terminals 300, 800 are used by viewers to view live content. The configuration of the viewer terminal 800 is the same as that of the viewer terminal 300.

A recorder terminal 900 is a communication terminal having a function of controlling the position, imaging direction, and imaging conditions etc. of a virtual camera used to capture video in virtual space. Video from a virtual camera controlled by a recorder terminal 900 is distributed to the viewer terminals 300, 800 as a distribution screen for distributing video from viewpoints different from those of a normal fixed distribution screen.

The following description is premised on a viewer using the viewer terminal 300 to view distributed content produced by a distributor using the distributor terminal 600. It is also premised on a viewer using the viewer terminal 800 to view distributed content (other distributed content) produced by a distributor (another distributor) using the distributor terminal 700, which is independent of the distributed content produced on the distributor terminal 600. It is also premised on the use of a recorder terminal 900 to control a virtual camera arranged in the virtual space used by the distributor terminal 700 to produce the other distributed content in order to capture video.

It is also premised on a participant using distributor terminal 700 participating in the distributed content produced using the distributor terminal 600. In the present embodiment, the distributor terminal 700 is a communication terminal used by a participant.

This content distribution system 2 includes one distributor terminal 600 and one distributor terminal 700. However, there may be a plurality of distributor terminals 600 used to produce distributed content and a plurality of distributor terminals 700 participating in the distributed content.

Also, a recorder terminal 900 may be arranged not only in the virtual space of the distributed content produced by the distributor terminal 700 but also in the virtual space of the distributed content produced by the distributor terminal 600. In the content distribution system 2, one content distribution server 500 is used, and the distributor terminals 600, 700 are both used to produce distributed content. However, the distributor terminals 600, 700 may also produce distributed content using two or more content distribution servers 500 that provide different distribution platforms.

<Configuration of Content Distribution Server>

The configuration of the content distribution server 500 will now be described in detail. As shown in FIG. 9, the content distribution server 500 includes a communication unit 110 that communicates with other devices, a storage unit 120 that stores various types of data, a clock unit 130 that keeps time, and a control unit 540 for controlling the entire device. These components are connected to each other via a bus line BL.

The control unit 540 can be, for example, a CPU. The control unit 540 controls the entire operation of the content distribution server 500 by executing a program stored in the storage unit 120. The control unit 540 executes various controls on timing based on the number of pulses counted by the clock unit 130. The control unit 540 also counts the elapsed time from the start of the live content based on the time kept by the clock unit 130, and determines whether or not a predetermined time (for example, the scheduled distribution time) has elapsed.

The functional configuration of the control unit 540 will now be described. The control unit 540 functions as an information acquiring unit 541, a video generating unit 542, a distribution unit 543, a participation accepting unit 544, a list information distribution unit 545, and a link notification unit 546.

The information acquiring unit 541 acquires information on the virtual character used by the distributor from the distributor terminal 600 and motion information indicating the movement and line of sight of the distributor via the communication unit 110. The information acquiring unit 541 also acquires information related to the virtual character used by a participant who participates in the distributed content and acquires motion information indicating the movement and line of sight of the participant from the distributor terminal 700 used by a viewer (participant) via the communication unit 110. The information acquiring unit 541 acquires audio information from the distributor terminals 600, 700 via the communication unit 110.

The video generating unit 542 generates video in virtual space that synthesizes the movement by the distributor and a participant as movement by the virtual character.

The distribution unit 543 distributes live content based on the video generated by the video generating unit 542. Live content based on the generated video is information indicating video rendered from each viewpoint relative to the generated video data. Specifically, the live content contains information indicating video in which the generated video is viewed from the viewpoint of the virtual character of the distributor, video (a distribution screen) in which the generated video is viewed from the viewpoint of the virtual camera for distribution, and video (another distribution screen) in which generated video of the distributed content is viewed from the viewpoint of a virtual camera controlled by the recorder terminal 900.

The video generating unit 542 generates video in which the virtual character of the distributor or a participant is moved into the virtual space used for the distributed content of the distributor or the distributed content of the participant, and the distribution unit 543 distributes video of the distributed content that integrates the distributed content and the other distributed content as live content. The video generating unit 542 and the distribution unit 543 may also be configured so that both distributed contents are distributed side-by-side without being integrated.

When another distributor participates in the distributed content from the distributor terminal 600, the distribution unit 543 may display synthesized video in which both the distributor and the other distributor both appear on the viewer terminals 300, 800.

When another distributor participates in the distributed content of the distributor as a participant, the video generating unit 542 may generate video in which the virtual characters of the distributor and the participant are moved into another virtual space, and the distribution unit 543 may distribute video of the distributed content in which the distributed content is integrated with the other distributed content as live content. This other virtual space is a virtual space that is different from the virtual space used by the distributor to produce distributed content and the virtual space used by the participant to produce distributed content.

The live content distributed by the distribution unit 543 includes not only information indicating a video but also audio information. The distribution unit 543 distributes audio information acquired by the information acquiring unit 541 and audio information stored in the storage unit 120 for production purposes as live content.

When a plurality of virtual cameras is arranged in a virtual space, the distribution unit 543 may switch between video captured by the plurality of virtual cameras in accordance with predetermined conditions and distribute the captured video as live content. These predetermined conditions can include one or more of the following: whether a video switching operation was executed by the distributor or a viewer, predetermined timing (that is, scheduled setting), whether a virtual character has moved, and whether a participant is participating. For example, when a viewer performs a video switching operation on a viewer terminal 300, 800, the viewer can switch like channels between the distribution of video taken by the recorder with the virtual camera, the distribution screen of the distributor who granted participation, the distribution screen of the participant, and the distribution of video integrating the distributed content of the distributor and the distributed content of the participant.

The participation accepting unit 544 acquires participation acceptance information from the distributor terminal 600 via the communication unit 110. When the participation accepting unit 544 acquires participation acceptance information, it accepts the request from another person for participation in the virtual space used by the distributor for distribution. The other person in the present embodiment is another distributor who uses a distributor terminal 700. The participation accepting unit 544 may accept the participation request while the distributor is producing distributed content, or may accept the participation request before the distributed content is produced.

The participation accepting unit 544 acquires information on the other person who wishes to participate and displays it on the distributor terminal 600 being used to produce the distributed content in which the other person wishes to participate. The information on the other person can be, for example, information indicating a user name or a virtual character. The participation accepting unit 544 displays a screen for permitting or denying participation by the other person who wishes to participate on the distributor terminal 600 being used to produce the distributed content in which the other person wishes to participate. If the distributor grants permission, the other person may participate in the distributed content as a participant.

Information on the other person also includes information related to viewers viewing the other distributed content (viewers using viewer terminals 800) and recorders using virtual cameras in the other distributed content (recorders using recorder terminals 900).

The participation accepting unit 544 displays a screen on the distributor terminal 600 for accepting or denying participation of a recorder (recorder using a recorder terminal 900) who is capturing the content distributed by another person and who wishes to participate in the distributed content with a virtual camera. When a recorder is granted permission to participate, the video generating unit 542 moves the virtual camera of the recorder into the virtual space of the distributed content being produced using the distributor terminal 600 so that the virtual camera of the recorder is used in both the distributed content and the other distributed content. The basic principles for sharing virtual cameras will be described later in greater detail.

A participation URL to be used when participating may be transmitted to a distributor terminal 700 granted permission to participate. The participation accepting unit 544 may also display on the distributor terminal 600 an operation screen for transmitting the participation URL to the communication terminal of another person who wishes to participate in the distributed content. In this case, the distributor may simply transmit the participation URL instead of granting permission to participate (using the permission information transmission operation described later).

When participation by a recorder is rejected, the recorder terminal 900 is deactivated so that the virtual camera cannot be used, only the functions similar to those of a viewer terminal 300, 800.

The list information distribution unit 545 distributes list information on the distributed content that the participation accepting unit 544 will accept participation requests for based on the participation acceptance information acquired from the distributor terminal 600. Specifically, the list information distribution unit 545 displays a screen on another person's communication terminal that shows list information on the distributed content for which participation requests are being accepted via the communication unit 110. In the present embodiment, the communication terminal of the other person is a distributor terminal 700 used to produce other distributed content. In the present embodiment, only a single distributor terminal 600 accepts participation requests, but when a plurality of distributor terminals 600 are accepting participation requests, the list information on distributed content can list those participation requests.

The link notification unit 546 displays a link for viewing the other distributed content or content distributed by a recorder terminal 900 recording the other distributed content on viewer terminals 300, 800 to view either the distributed content or the other distributed content. In this way, a viewer can be notified of the existence of the other distributed content. For example, the link notification unit 546 can notify a viewer terminal 300 of the URLs of the other distributed content from the distributor terminal 700 and distributed content from the recorder terminal 900. The link notification unit 546 notifies the viewer terminal 800 of the URL for distributed content from the distributor terminal 600.

<Configuration of Distributor Terminal>

The configuration of the distributor terminal 600 will now be described in detail. The configuration of the distributor terminal 700 is the same as the configuration of the distributor terminal 600.

As shown in FIG. 10, the distributor terminal 600 includes a communication unit 210 for communicating with other devices, an operating unit 220 for receiving user operations, a storage unit 230 for storing various types of data, a display unit 240 for displaying various types of images, an audio input unit 250 for receiving audio input, an operation input unit 260 for inputting motion information, an audio output unit 270 for outputting various types of audio, and a control unit 680 for controlling the entire device. These components are connected to each other via a bus line BL.

The control unit 680 can be, for example, a CPU. The control unit 680 controls the entire operation of the distributor terminal 600 by executing a program stored in the storage unit 230.

The functional configuration of the control unit 680 will now be described. The control unit 280 functions as a content acquiring unit 281, a display control unit 282, an audio output control unit 283, an inputted information transmitting unit 284, a participation acceptance information transmitting unit 285, a permission information transmitting unit 286, and a participation request information transmitting unit 687.

The participation request information transmitting unit 687 transmits participation request information indicating a participation request to the content distribution server 500 via the communication unit 210. Specifically, the participation request information transmitting unit 687 transmits participation request information when a user wishes to participate after viewing the screen showing the list information on distributed content accepting participation requests.

The distributor terminals 600, 700 in the present embodiment are configured to accept participation by other users in the virtual space used by a user to produce distributed content, and for participation in the virtual space used by another user to produce distributed content. However, the distributor terminals 600, 700 are not limited to this configuration. For example, one of the distributor terminals 600, 700 (for example, distributor terminal 600) may have a configuration for accepting participation in the virtual space used for the distributed content and the other one (for example, distributor terminal 700) may have a configuration for accepting participation in the virtual space used for the other distributed content.

<Specific Example of a Distribution Screen and Imaging Screen>

Specific examples of a distribution screen displayed based on information indicating live content being streamed and a recording screen for a virtual camera used by a recorder will now be described.

FIG. 11 is a diagram showing an example of a distribution screen displayed on viewer terminal 300 or viewer terminal 800. FIG. 11 (A) shows the distribution screen of a distributor before another distributor participates. In other words, FIG. 11 (A) is a distribution screen displayed on the viewer terminal 300 for viewing the distributed content from the distributor terminal 600.

FIG. 11 (B) shows the distribution screen of the other distributor before the other distributor participates. In other words, FIG. 11 (B) is a distribution screen displayed on the viewer terminal 800 for viewing the distributed content from the distributor terminal 700.

FIG. 11 (C) shows the captured screen after the other distributor participates. In other words, FIG. 11 (C) shows the distribution screen displayed on the viewer terminals 300, 800 to view the content distributed by the distributor terminals 600, 700. In the explanation of this example, the other distributor B using distributor terminal 700 participates in the distributed content produced by distributor A using distributor terminal 600, and the distributed content produced by distributor B and distributor A is integrated.

In area A3 of FIG. 11 (A), FIG. 11 (B), and FIG. 11 (C), video rendered from the viewpoint of a virtual camera (not shown) is displayed as video in virtual space. A comment field for posts from viewers is displayed in area A4, and a post button B1 is displayed to the right of the comment field.

In FIG. 11 (A), the virtual character 40 indicating distributor A is displayed in the video shown in area A3. Distributor A is the distributor who produces distributed content using distributor terminal 600. An object 20 indicating a table as a virtual object is also displayed in the video.

In FIG. 11 (B), the virtual character 50 indicating distributor B is displayed in the video shown in area A3. Distributor B is the distributor who produces distributed content using distributor terminal 700. An object 60 indicating a virtual camera is also displayed in the video. The object 60 indicating this virtual camera is a virtual camera controlled by a recorder terminal 900.

Here, when distributor A grants permission to distributor B who uses distributor terminal 700 to participate, distributor terminal 700 sends information indicating the virtual character used by distributor B and motion information on distributor B to the content distribution server 500. When distributor A grants permission to participate to the recorder who is recording distributed content by distributor B with a virtual camera (the object 60 indicating a virtual camera) using a recorder terminal 900, the object 60 indicating the virtual camera is also moved to the virtual space for distributed content from distributor A.

As a result, as shown in FIG. 11 (C), the virtual character 40 indicating distributor A, the virtual character 50 indicating distributor B, and the object 60 indicating the virtual camera are displayed in area A3 and appear on the distribution screen. In FIG. 11 (C), the virtual character 50 of distributor B and the object 60 indicating the virtual camera appear in the virtual space used by distributor A to produce the distributed content. However, the virtual character 50 and the object 60 indicating the virtual camera do not appear in area A3 of the distribution screen unless they are in the range of the virtual camera (not shown).

The distribution unit 543 in the content distribution server 500 displays distributor A and distributor B, who is a participant, on the viewer terminals 300, 800 so that they can be distinguished from one another. For example, in area A3 of the distribution screen in FIG. 11 (C), a character string for distributor A indicating a user name is displayed above the virtual character 40 for distributor A. A character string for distributor B indicating a user name is also displayed above the virtual character 50 for distributor B.

These character strings are not displayed in FIG. 11 (A) and FIG. 11 (B). These character strings are displayed only when a plurality of distributors share a virtual space. However, the distribution unit 543 may be configured to display a character string even when only one distributor is using the virtual space as shown in FIG. 11 (A) and FIG. 11 (B).

Note that the distributor terminals 600, 700 display video in virtual space rendered from the viewpoint of each virtual character (that is, virtual character 40 or virtual character 50) instead of the distribution screen shown in FIG. 11.

FIG. 12 is a diagram showing an example of a screen captured by a virtual camera (the object 60 indicating a virtual camera). FIG. 12 (A) shows the captured screen before another distributor participates. FIG. 12 (A) corresponds to the distribution screen shown in FIG. 11 (B), and shows a screen captured from the viewpoint of the object 60 indicating the virtual camera in the virtual space of the distributed content produced by distributor B. The captured screen can be used, for example, on a channel for distributed content other than that produced by distributor A and distributor B.

FIG. 12 (B) shows the captured screen after the other distributor participates. FIG. 12 (B) corresponds to the distribution screen shown in FIG. 11 (C), and shows a screen captured from the viewpoint of the object 60 indicating the virtual camera in the virtual space of the distributed content produced by distributor A. Unlike the captured screen shown in FIG. 12 (A), the virtual character 40 indicating distributor A and the object 20 indicating the table appear in the captured screen shown in FIG. 12 (B).

<Processing Flow>

An example of control processing executed by the content distribution server 500 will now be described with reference to FIG. 13. This processing is executed when the content distribution server 500 has acquired participation acceptance information from distributor terminal 600.

First, the list information distribution unit 545 in the control unit 540 displays a screen showing list information on distributed content that is accepting participation requests on the other distributor terminals 700 based on the participation acceptance information acquired from distributor terminal 600 (step S201).

The participation accepting unit 544 in the control unit 540 accepts the participation request from the other distributor in the virtual space used by the distributor to produce distributed content (step S202). Specifically, the participation accepting unit 544 acquires the participation request information transmitted from the participation acceptance information transmitting unit 687 in the other distributor terminal 700 via the communication unit 110.

The participation accepting unit 544 in the control unit 540 acquires information on the other person who wants to participate (that is, the other distributor) and a recorder who is recording the distributed content produced by the other person, and displays the content in which they wish to participate on the distributor terminal 600 (step S203). The participation accepting unit 544 also displays a screen for allowing or denying participation by the other person and the recorder who wish to participate on the distributor terminal 600 to permit or deny participation (step S204).

Here, the control unit 540 determines whether or not the distributor has permitted the participation of the other distributor (step S205). Specifically, the control unit 540 determines whether or not the distributor has permitted participation based on the permission information acquired from the permission information transmitting unit 286 in the distributor terminal 600.

When the participation by the other distributor is denied (step S205; N), the information acquiring unit 541 in the control unit 540 acquires various types of information on the distributor from the distributor terminal 600 used to produce the distributed content (step S207). In other words, when there are no participants, the content distribution server 500 acquires only information on the virtual character of the distributor and motion information, and then performs steps S208 and S209.

However, when participation by the other distributor is permitted (step S205; Y), the information acquiring unit 541 in the control unit 540 acquires various types of information on the distributor and various types of information on the other distributor participating in the distributed content produced on the distributor terminal 600 allowing participation in the distributed content (S206). In other words, the content distribution server 500 acquires information on the virtual characters and motion information on both the distributor and the participant, and then performs steps S211 and S212.

The control unit 540 determines whether or not the distributor has granted permission to participate to the recorder who is recording in the virtual space of the other distributed content (step S208). Specifically, the control unit 540 determines whether or not the distributor has permitted participation based on the permission information acquired from the permission information transmitting unit 286 in the distributor terminal 600.

When participation by the recorder has been refused (step S208; N), the control unit 540 controls the state of distribution so that the virtual camera of the recorder terminal 900 cannot be used, only the functions similar to those of a viewer terminal 300, 800 (step S210).

However, when participation by the recorder has been permitted (step S208; Y), the information acquiring unit 541 in the control unit 540 acquires information on the recorder's virtual camera operated from the recorder terminal 900 (step S209). The content distribution server 500 reflects the acquired virtual camera information in the virtual space by the distributor terminal 600 to produce distributed content. As a result, the recorder can continue to capture video with the virtual camera in the virtual space at the new destination.

The video generating unit 542 in the control unit 540 generates video in virtual space in which the motion information acquired by the information acquiring unit 541 is synthesized as movement by a virtual character (step S211). When participation by the recorder is permitted, the video generating unit 542 moves the virtual camera of the recorder into the virtual space of the distributed content, and the virtual camera of the recorder is used in both the distributed content and the other distributed content.

The distribution unit 543 in the control unit 540 distributes live content based on video generated by the video generating unit 542 (step S212). For example, the distributor terminal 600 displays video from the viewpoint of the virtual character of the distributor, and the other distributor terminal 700 participating in the distributed content displays video from the viewpoint of the virtual character of the participant. The distribution screen is also displayed on the viewer terminals 300, 800 of viewers who are not participating in the distributed content. The recorder terminal 900 allowed to participate displays video taken by the virtual camera in the virtual space at the transfer destination, and the recorded video is also used in the other distributed content. When the virtual character of the other distributor or the virtual camera moves, the link notification unit 546 in the control unit 540 may display a link on the viewer terminals 300, 800 for viewing the distributed content from the recorder terminal 900 capturing the distributed content or the other distributed content, or may send a link to the viewer terminals 300, 800 for viewing the distributed content at the transfer destination.

The control process executed by the content distribution server 500 was described above. However, the processing flow is not limited to this particular flow.

For example, when accepting participation while the distributor is producing distributed content, the distributor may execute the processing in steps S207, S211, and S212 before step S201. Instead of step S204, which is processing performed to reflect the decision of the distributor to allow participation, a process of automatically granting participation to a predetermined number of requesting parties may be executed on a first-come-first-served basis.

<Explanation of Effects>

In the content distribution system 2 of the present embodiment, the content distribution server 500 accepts requests from other distributors to participate in distributed content via the network. In this case, the distributor and other distributors can share virtual space as their respective virtual characters in the production of distributed content even when they are separated from each other in real space. Instead of simply synthesizing video, the content distribution system 2 allows other distributors to enter and exit a virtual space serving as a recording studio for distributed programming, and other distributors can go from one virtual space serving as a recording studio to another virtual space serving as a recording studio. Therefore, the content distribution system 2 in the present embodiment is able to increase the convenience of sharing virtual space.

The description of the embodiment has ended, but this embodiment is merely an example. Therefore, the specific configuration of the content distribution systems 1, 2 and the processing details etc. are not limited to those described in the embodiments. Modified examples of the embodiments will now be described. Note that components identical to those in the content distribution systems 1, 2 of the embodiments are denoted by the same reference numbers.

Modified Examples

The order in which the control processing is executed by the content distribution servers 100, 500 is not limited to the examples shown in FIG. 7 and FIG. 13. Not only are the details of the control processing executed by the content distribution servers 100, 500 not limited to the examples shown in FIG. 7 and FIG. 13, but some of the processing may also be omitted.

In the embodiments described above, the content distributed by the content distribution servers 100, 500 is modified according to participation acceptance status. In other words, the content is modified at the distribution stage. However, the distributed content may be the same for everyone, and display control may be executed on the content when the video is displayed on the receiving end. For example, when the viewer terminals 300, 800, etc. execute a program to display the content, the display control may be executed according to participation acceptance status. For example, a modified example can be realized in which the viewer terminals 300, 800 receive participation permission information from the distributor and perform an operation corresponding to this information.

In the second embodiment, the distributed content accepting participation and the participating distributed content were at a 1:1 correspondence. However, the configuration of the content distribution system 2 is not limited to this participation method. For example, a virtual character from a certain distributor terminal may simultaneously participate in the virtual space of distributed content produced by a plurality of other distributor terminals. Virtual characters of a plurality of other distributors may also participate in the virtual space of the distributed content produced by a certain distributor terminal. In addition, the content distribution system 2 may have a configuration in which there is a plurality of distributors of distributed content accepting participation and a plurality of distributors of distributed content participating. In other words, a plurality of distributed programs may be integrated.

In the second embodiment, the distribution screen distributed by the participant at the transfer source (other distributor) is integrated with the distribution screen at the transfer destination. However, the distribution unit 543 in the content distribution server 500 may be configured to continue distribution so that the distribution screen distributed by the participant at the transfer source does not change and only the virtual character of the other distributor is displayed. Also, display control may be performed on the viewer terminals 300, 800 so that the distribution screen after integration is automatically displayed without any destination link notification.

In the embodiments, the content distribution servers 100, 500 include participation accepting units 144, 544 that only accept participation based on participation requests. However, the content distribution servers 100, 500 may also include a departure accepting unit that accepts the departure of participants (that is, viewers or other distributors) after they have participated. For example, departure may be realized by having the distributor who has permitted participation issue an instruction to the content distribution servers 100, 500 to expel a participant. Departure may also be realized by having a participant send departure request information to the content distribution servers 100, 500. In this configuration, a participant can enter and exit a virtual space used by a distributor to produce distributed content.

The content distribution servers 100, 500 are not limited to a configuration in which participation is accepted based on participation requests. For example, the content distribution servers 100, 500 may be configured so that invitations from distributors are accepted. For example, a distributor using a distributor terminal 200, 600 may send invitation information for inviting viewers or other distributors to a content distribution server 100, 500, and the content distribution server 100, 500 may notify communication terminals used by viewers or other distributors that they have received an invitation. This makes it possible to realize participation by invitation.

In the content distribution system 1 according to the embodiment described above, the video generating unit 142, 542 in the content distribution server 100, 500 generates video in virtual space in which the movement of the distributor is synthesized as the movement of a virtual character. However, the content distribution server 100, 500 may be configured without a video generating unit 142, 542.

For example, the distributor terminal 200, 600, 700 or a participating viewer terminal 400 may generate the video and transmit the video data to the content distribution server 100, 500, and the content distribution server 100, 500 may distribute live content based on the video data acquired from the distributor terminal 200, 600, 700 or the participating viewer terminal 400. Also, processing substantially similar to the processing performed by the video generating unit 142, 542 may be performed by the content distribution server 100, 500 working with the distributor terminal 200, 600, 700 or the participating viewer terminal 400. In this configuration, the processing burden on the content distribution server 100, 500 can be reduced as compared to when the content distribution server 100, 500 generates video in virtual space.

When distributed content is produced by a configuration in which the distributor terminal 200, 600 generates the video, a participant terminal participating in the distributed content (for example, a distributor terminal 700 used by a distributor or a viewer terminal 400 used by a viewer participating in the distributed content) acquires motion information and character information from the participant, generates video that reflects the movements of the participant as movements by a virtual character, and sends the video to the content distribution server 100, 500. The content distribution server 100, 500 then transmits the video data to the distributor terminal 200, 600 used by the main distributor of the distributed content in which the participant is participating. The distributor terminal 200, 600 used by the main distributor acquires the motion information and character information from the main distributor, generates video in virtual space, and synthesizes the video with video data from participants acquired from the content distribution server 100, 500. In this way, video data can be generated that shows the main distributor together with the participants. The distributor terminal 200, 600 of the main distributor transmits the synthesized video data to the content distribution server 100, 500, and the content distribution server distributes live content based on the video data.

As a result, the content distribution server 100, 500 does not have to include a video generating unit 142, 542 to generate video in virtual space, but may simply acquire video in virtual space synthesizing movement by the distributor (or by a participant) as movement by a virtual character, and distribute live content based on the video.

Also, the content distribution servers 100, 500 may receive character information and motion information for the distributor and the participants from their respective terminals, and the content distribution servers 100, 500 may send motion information on the participant to the distributor and motion information on the distributor to the participant. In this way, the content distribution server 100, 500 may serve as an intermediary to generate video in virtual space in which the virtual character of the distributor and the virtual character of the participant are present on each terminal. The terminal for generating video may be either the distributor terminal 200, 600 or the participant terminal, and the other terminal may simply receive and display the generated video data as live content.

In the content distribution systems 1, 2 according to the embodiments, the distributor terminal 200, 600, 700, the viewer terminals 300, 800, and the recorder terminal 900 have different configurations and can be distinguished from each other. However, the individual components in each of these devices may be combined to form two or more configurations having these functions.

The content distribution server 100, 500 also does not have to distribute video data as live content. For example, the distribution unit 143, 543 in the content distribution server 100, 500 may distribute live content for synthesizing video in virtual space in which information from the distributor is used as information for a virtual character. In this case, the information required for the synthesis processing is distributed, and the viewer terminal 300, 800 or distributor terminal 200, 600, or recorder terminal 900 etc. receiving the information synthesizes (renders) video based on first additional information and second additional information, and displays the video.

When the content distribution server 100, 500 distributes video data as live content, different live content may be distributed based on disclosure restriction settings depending on the destination of the distributed content. In this case, the viewer terminal 300, 800, the distributor terminal 200, 600, or the recorder terminal 900 etc. receiving the data, simply displays video based on the received data. In other words, video data is generated during distribution. However, when the content distribution server 100, 500 distributes live content for synthesizing video, the viewer terminal 300, 800, the distributor terminal 200, 600, or the recorder terminal 900 etc. receiving the live content performs the synthesizing process based on the received data. In this case, the content distribution server 100, 500 distributes the same live content, and the receiving terminal executes processing to generate the video that is displayed.

The functions of content distribution system 1 in the present disclosure may also be realized by, for example, a computer executing a program instead of devices described above. The program for realizing the functions of the content distribution system 1 may be stored on a computer-readable medium such as USB (universal serial bus) memory, a CD-ROM (compact disc-read only memory), a DVD (digital versatile disc), or an HDD (hard disc drive), or may be downloaded to a computer via a network.

A preferred embodiment of the present disclosure was described above, but the present disclosure is not limited to this embodiment, and the present disclosure encompasses the invention described in the claims and that which is equivalent. Also, the configurations of the devices described in the embodiments and modified examples can be combined when appropriate as long as there are no technical contradictions.

KEY TO THE DRAWINGS

1, 2: Content distribution systems
100, 500: Content distribution servers
200, 600, 700: Distributor terminals
300, 400, 800: Viewer terminals
900: Recorder terminal

The invention claimed is:

1. A content distribution server, including a memory and processor, comprising:
   a participation accepting unit configured to accept a participation request from a first user into a virtual space used to distribute first distributed content from a first distributor;
   an information acquiring unit configured to acquire motion information indicating movement by the first distributor and a first participant participating based on the participation request, as well as information on virtual characters corresponding to the first distributor and the first participant;
   a distribution unit configured to distribute live content based on video in the virtual space obtained by synthesizing motion information acquired by the information acquiring unit with movement by the virtual characters,
   wherein the first distributor distributes the first distributed content to a distributor terminal or a communication terminal,
   wherein the first participant views the first distributed content and distributes second distributed content,
   wherein the communication terminal is configured to display a combined image comprising the first distributor and the first participant
   wherein the distribution unit distributes as live content, when the first participant is another distributor producing distributed content different from the first distributed content, video that integrates the first distributed content with the other distributed content by moving the virtual character of the first distributor or the first participant into the virtual space used in the first distributed content or the other distributed content.

2. The content distribution server according to claim 1, wherein the motion information and the virtual character information acquired by the information acquiring unit are transmitted to the distributor terminal used by the first distributor to generate video data indicating video in virtual space on the distributor terminal, wherein the distributor terminal transmits the video data to the distribution terminal, and wherein the distribution unit distributes live content based on the video data received from the distributor terminal.

3. The content distribution server according to claim 1, wherein the first participant comprises a first viewer who watches the first distribution content or another distributor who produces other distributed content different from the first distributed content, and the distribution unit displays video synthesized to display both the first distributor and another distributor on the communication terminal of a viewer when the first participant is the another distributor producing other distributed content in virtual space.

4. The content distribution server according to claim 1, wherein the participation receiving unit displays on the communication terminal of the first distributor a screen for permitting or denying participation of a recorder who is recording with a virtual camera the distributed content of another user who wishes to participate.

5. The content distribution server according to claim 4, wherein the virtual camera of the recorder is moved into the virtual space of the first distributed content, and the virtual camera of the recorder interacts with both the first distributed content and the second distributed content when participation by the recorder is permitted.

6. The content distribution server according to claim 1, wherein the distribution unit distributes as live content, when the first participant is another distributor producing distributed content different from the first distributed content, video that integrates the first distributed content with the other distributed content by moving the virtual characters of the first distributor and the first participant into another virtual space.

7. A content distribution system comprising:
  a content distribution server configured to accept a participation request from a user into a virtual space used in distributing first distributed content from a distributor, and distributes live content based on video in virtual space obtained by synthesizing motion information indicating movement by the distributor and a participant participating on the basis of the participation request as movement by virtual characters of the distributor and the participant;
  a distributor terminal used by the distributor; and
  a viewer terminal used by a viewer who views the live content,
  wherein the live content is transmitted to the distributor terminal or the viewer terminal,
  wherein video data representing the participant in the virtual space is generated at the distributor terminal or the viewer terminal,
  wherein the live content is distributed to the viewer terminal if the distributor comprises a participant who watches the distributed content or performs a second distribution different from the distributed content in the virtual space
  wherein the content distribution server distributes as live content, when the participant is another distributor producing distributed content different from the first distributed content, video that integrates the first distributed content with the other distributed content by moving the virtual character of the distributor or the participant into the virtual space used in the first distributed content or the other distributed content, and
  wherein the content distribution server includes a memory and a processor.

8. A content distribution method comprising:
  accepting a participation request from a user into a virtual space used in distributed content from a distributor via a content distribution server;
  acquiring motion information indicating movement by the distributor and a participant participating on the basis of the participation request, as well as information on virtual characters of the distributor and the participant;
  distributing live content based on video in virtual space obtained by synthesizing motion information acquired in the information acquiring step with movement by the virtual characters;
  transmitting the motion information, the live content, and virtual character information to a viewer terminal or a distributor terminal; and
  displaying, on the viewer terminal, synthesized content of the distributor and a second distributor when the participant is the second distributor distributing second distributed content in the virtual space
  distributing as live content, when the second distributor distributes second distributed content different from the distributed content, video that integrates the distributed content with the second distributed content by moving the virtual character of the distributor or the participant into the virtual space used in the distributed content or the second distributed content,
  wherein the content distribution server includes a memory and a processor.

* * * * *